United States Patent
King et al.

(10) Patent No.: US 9,787,950 B2
(45) Date of Patent: Oct. 10, 2017

(54) METHOD AND APPARATUS FOR AN AUTOMATED FUEL AUTHORIZATION PROGRAM FOR FUEL TERMINALS USING A CAMERA AS PART OF THE AUTHORIZATION PROCESS

(71) Applicant: ZONAR SYSTEMS, INC., Seattle, WA (US)

(72) Inventors: Michael Charles King, Kent, WA (US); Rick Fadler, Newcastle, WA (US); Charles Michael McQuade, Issaquah, WA (US)

(73) Assignee: ZONAR SYSTEMS, INC., Seattle, WA (US)

(*) Notice: Subject to any disclaimer, the term of this patent is extended or adjusted under 35 U.S.C. 154(b) by 295 days.

(21) Appl. No.: 14/217,404

(22) Filed: Mar. 17, 2014

(65) Prior Publication Data

US 2014/0267741 A1    Sep. 18, 2014

Related U.S. Application Data

(60) Provisional application No. 61/800,064, filed on Mar. 15, 2013, provisional application No. 61/802,440, filed on Mar. 16, 2013, provisional application No. 61/800,726, filed on Mar. 15, 2013, provisional application No. 61/800,125, filed on Mar. 15, 2013, provisional application No. 61/799,990, filed on Mar. 15, 2013.

(51) Int. Cl.
| | |
|---|---|
| *H04N 7/18* | (2006.01) |
| *G07F 7/08* | (2006.01) |
| *G07F 13/02* | (2006.01) |
| *G06Q 20/34* | (2012.01) |

(52) U.S. Cl.
CPC .......... *H04N 7/183* (2013.01); *G06Q 20/342* (2013.01); *G07F 7/0893* (2013.01); *G07F 13/025* (2013.01)

(58) Field of Classification Search
CPC ............. G06F 21/44; G06F 2221/2129; G06C 20/342; G08G 1/0175; H04N 7/183
USPC ...................................................... 348/156
See application file for complete search history.

(56) References Cited

U.S. PATENT DOCUMENTS

| | | | |
|---|---|---|---|
| 4,263,945 | A | 4/1981 | Van Ness |
| 4,469,149 | A | 9/1984 | Walkey et al. |
| 4,658,371 | A | 4/1987 | Walsh et al. |
| 4,846,233 | A | 7/1989 | Fockens |
| 4,934,419 | A | 6/1990 | Lamont et al. |

(Continued)

*Primary Examiner* — Jamie Atala
*Assistant Examiner* — Fabio Lima

(57) ABSTRACT

A fuel authorization system enables data to be exchanged between vehicles and a fuel vendor, to verify that the vehicle is authorized to receive fuel. Each fuel island is equipped with a camera and a short range radio (RF) component. Participating vehicles are equipped with fuel authorization component including an IR transmitter and a RF component that can establish a data link with the fuel island's RF unit. When the camera senses a vehicle in the fuel lane, an RF query is sent to the vehicle. Participating vehicles respond with an IR transmission. An RF data link is then established between the enrolled vehicle and the fuel vendor to verify that the vehicle is authorized to receive fuel. Once the verification is complete, the fuel dispenser is enabled. In some embodiments, the IR data link is not required, as the camera can distinguish between multiple fuel lanes.

19 Claims, 8 Drawing Sheets

(56) References Cited

U.S. PATENT DOCUMENTS

| | | |
|---|---|---|
| 5,072,380 A | 12/1991 | Randelman et al. |
| 5,204,819 A | 4/1993 | Ryan |
| 5,359,522 A | 10/1994 | Ryan |
| 5,440,109 A | 8/1995 | Hering et al. |
| 5,596,501 A | 1/1997 | Comer et al. |
| 5,890,520 A | 4/1999 | Johnson, Jr. |
| 5,913,180 A | 6/1999 | Ryan |
| 5,923,572 A | 7/1999 | Pollock |
| 5,956,259 A | 9/1999 | Hartsell, Jr. et al. |
| 6,024,142 A | 2/2000 | Bates |
| 6,070,156 A | 5/2000 | Hartsell, Jr. |
| 6,085,805 A | 7/2000 | Bates |
| 6,128,551 A | 10/2000 | Davis et al. |
| 6,169,938 B1 | 1/2001 | Hartsell, Jr. |
| 6,616,036 B2 | 9/2003 | Streicher et al. |
| 6,899,151 B1 | 5/2005 | Latka et al. |
| 7,155,199 B2 | 12/2006 | Zalewski |
| 7,604,169 B2 | 10/2009 | Demere |
| 7,640,185 B1 | 12/2009 | Giordano et al. |
| 2001/0034565 A1 | 10/2001 | Leatherman |
| 2005/0010797 A1* | 1/2005 | Rushworth ...... G08B 13/19641 726/26 |
| 2005/0018853 A1 | 1/2005 | Lain et al. |
| 2007/0150196 A1* | 6/2007 | Grimm ...................... B60T 7/22 701/301 |
| 2009/0048945 A1 | 2/2009 | DeLine |
| 2009/0255195 A1* | 10/2009 | Bridgman ............... E04H 14/00 52/174 |
| 2010/0088127 A1 | 4/2010 | Betancourt et al. |
| 2010/0191674 A1 | 7/2010 | Condon |
| 2010/0198491 A1 | 8/2010 | Mays |
| 2011/0035049 A1 | 2/2011 | Barrett |
| 2012/0095920 A1* | 4/2012 | McQuade ............. H04L 9/3215 705/50 |
| 2012/0176499 A1* | 7/2012 | Winter ............... G06K 9/00825 348/148 |
| 2012/0223829 A1 | 9/2012 | Tyler |
| 2012/0303531 A1 | 11/2012 | Betancourt et al. |
| 2014/0263629 A1 | 9/2014 | McQuade et al. |

\* cited by examiner

METHOD AND APPARATUS FOR AN AUTOMATED FUEL AUTHORIZATION PROGRAM FOR FUEL TERMINALS USING A CAMERA AS PART OF THE AUTHORIZATION PROCESS

RELATED APPLICATIONS

This application is based on four prior provisional application Ser. No. 61/799,990, Ser. No. 61/800,726, Ser. No. 61/800,064 and Ser. No. 61/800,125, each filed on Mar. 15, 2013, the benefit of the filing dates of which are hereby claimed under 35 U.S.C. §119(e). This application is also based on a prior provisional application; Ser. No. 61/802,440, filed on Mar. 16, 2013, the benefit of the filing date of which is hereby claimed under 35 U.S.C. §119(e).

BACKGROUND

The trucking industry has an ongoing problem with fuel theft. Trucking companies normally issue fuel cards to drivers. The drivers purchase fuel for company trucks at national refueling chains (i.e., truck stops).

A large problem is that owner operators also frequent such refueling stations. Company drivers often make deals with owner operators to allow the owner operators use of a company fuel card for a cash payment. For example, the owner operator will give the company driver $50 in cash to purchase $150 of fuel on the company fuel card, saving the owner operator $100 in fuel costs. This type of fraud is very difficult for the fleet operators to detect and prevent, because the amount of diverted fuel may be sufficiently small relative to the miles that the fleet vehicle is driven by the driver so as to be difficult to notice, even when fuel use patterns of the vehicle are analyzed.

It would therefore be desirable to provide a more secure method and apparatus for implementing fuel authorization in the trucking industry that actually prevents owner operators from stealing fuel charged to a fleet operator account.

SUMMARY

The concepts disclosed herein encompass a plurality of components that can be used in a fuel authorization program, in which vehicles enrolled in the fuel authorization program can automatically be approved to receive fuel if their credentials are valid.

One aspect of the concepts disclosed herein is based on using a camera to detect motion next to a fuel pump (i.e., in a specific fuel lane). This embodiment is particularly well suited to be deployed in private fuel terminals (PFT), where there generally are relatively few fuel pumps, and no canopy in which fuel authorization components can be deployed. The camera and other required fuel authorization components can be deployed on a pole (such as used for street lights or traffic signal lights at roadway intersections).

From the theft mitigation perspective, the PFT system incorporates a video surveillance system to capture each fuel transaction at the private fueling terminal, and associate the captured visual images with a fuel purchase transaction. The image data minimally will include images of the vehicle being fueled, and potentially could include images of the driver. While video surveillance is not new, what is different is that the image capture is triggered by the fuel authorization transaction, eliminating the need to search a large volume of surveillance footage to correlate image data to a particular transaction.

In at least one embodiment, the PTF system employs an automated camera, an infrared receiver (IR), a radio (such as a 2.4 GHz radio), and a microcontroller (the station fuel controller). A single pole will be installed to support the IR component and camera. Each enrolled vehicle will include an IR transmitter, a radio, and a controller (the vehicle fuel controller) programmed to interact with the PFT system. In general, once the camera detects a vehicle, the station fuel controller will issue an RF query to the vehicle. The vehicle will respond to the RF query by using the RF data link to convey fuel authorization credentials to the station fuel controller. The IR data link is used to unambiguously identify which fuel pump the vehicle is next to, in the case of there being multiple fuel pumps present. In some embodiments, the fuel authorization credentials are dynamically retrieved from a non-removable vehicle memory (such as can be accessed via the vehicle data bus or a vehicle ECU), such that simply moving fuel authorization components to a non-enrolled vehicle will not enable fuel authorization to be achieved. The station fuel controller consults local records or establishes a network connection with a fuel authorization database and determines if the fuel authorization credentials are valid. If so, the fuel pump is enabled. In some embodiments the fuel pump is automatically disabled if the camera detects the vehicle has moved away from the fuel pump. Some embodiments may allow a certain amount of movement to enable vehicles to be repositioned if necessary to allow the fuel dispenser to reach the vehicle's fuel tanks.

In at least one embodiment, the PTF system described above does not include the IR component, and an IR data link is not required. In such an embodiment, no IR data link is required because there is only one fuel pump. In a related embodiment, the PTF system without an IR data link is used to automatically control a gate that provides access to restricted area (which may or may not be a fuel terminal; noting in such embodiments IR is not required for a single gate, as the function of the IR component is to unambiguously identify which one of a plurality of fuel pumps or gates to activate).

In at least one embodiment, the PTF system described above does not include the IR component, and an IR data link is not required. In such an embodiment, the camera and camera signal processor can unambiguously determine from the image acquired by the camera which one of a plurality of fuel pumps (or gates) to activate.

In at least one embodiment, the PTF system described above does not include the IR component, although the IR data link is required. In such an embodiment, the camera and camera signal processor can detect and interpret IR data conveyed from the vehicle. In some embodiments, the IR data includes some or part of the fuel authorization credentials. In other embodiments, where the camera has a relatively large field of view that covers multiple fuel islands, the IR signal from the vehicle is detected by the camera, and used to determine to which fuel pump the vehicle is proximate.

Private fuel terminals are often unmanned and protected by locked gates. One aspect of the concepts disclosed herein is using a similar authorization technique, not to dispense fuel (or in addition to dispensing fuel), but to unlock the gate.

One aspect of the concepts disclosed herein is a fuel authorization component (a "puck", in reference to the shape of an exemplary commercial implementation) including an infrared red (IR) transmitter component and a radiofrequency component, such that the puck can establish both an IR and RF data link with the fuel vendor. The puck includes a controller that automatically implements one or more fuel authorization related functions. In at least one exemplary embodiment, the puck controller implements the function of automatically energizing the IR transmitter upon receiving an RF query from a fuel vendor. In at least one embodiment, the puck controller implements the function of energizing a first visible light element when an IR data link is established between the IR emitter in the puck and an IR receiver at the fuel lane. In at least one embodiment, the puck controller implements the function of energizing a second visible light element when the transmission of data (such as credentials, which in some embodiments is a VIN from the vehicle) over the IR data link is completed, and the vehicle can be slightly repositioned to accommodate fueling. In at least one embodiment, the puck controller implements the function of retrieving fuel authorization credentials from a local memory upon receiving an RF query from a signal from a fuel vendor, and conveying those credentials over the IR data link. In at least one embodiment, the puck controller implements the function of retrieving fuel authorization credentials from some memory component at the vehicle that is not part of the puck, via a hard wire data connection, upon receiving an RF query from a signal from a fuel vendor, and conveying those credentials over the IR data link. In at least one embodiment, the puck controller implements the function of using the RF component to determine if some other fuel authorization component with RF capability is present at the vehicle (such other fuel authorization components can be attached to a refrigerated trailer being pulled by a tractor unit). In at least one embodiment, the puck controller implements the function of using the RF component to communicate with the fuel vendor that the truck has left the fuel island when the IR data link is terminated (in such a fuel authorization paradigm, fuel delivery is only enabled when the IR data link is active).

In an exemplary, but not limiting embodiment, the puck is configured to wake up when receiving an RF query from a participating fuel vendor. The puck will energize the IR transmitter while the vehicle approaches a fuel island. When the vehicle is properly positioned, an IR data link with the fuel vendor will be established. In response, the puck will transmit at least some credentials to the fuel vendor. A light on the puck will illuminate when the IR data link is established. The IR communication with the vehicle lets the fuel vendor unambiguously know which fuel pump the vehicle is at (because only that fuel pump will receive the IR communication). In some embodiments, the puck uses the RF data link to send additional credentials to fully authorize the fuel transaction. In some embodiments, a second light on the puck illuminates when all the data that needs to be sent over the IR data link for the fueling transaction has been sent, so the driver knows he can slightly reposition the vehicle if necessary to make sure the hose from the fuel pump can reach the vehicles fuel tanks.

A related aspect of the concepts disclosed herein is fuel authorization component to be installed in a vehicle participating in a fuel authorization program, where the fuel authorization program is based on exchanging data between the vehicle and a fuel vendor via infrared (IR). The fuel authorization component (a related puck) includes a housing having a front surface and a rear surface, where the front and rear surfaces are substantially parallel and spaced apart. The related puck includes a light emitting element, that when activated emits visible light outwardly and away from the front surface, and an IR component for transmitting data over an IR data link, the IR component, when activated, emitting IR radiation outwardly and away from the rear surface. The related puck further includes a controller that automatically implements the function of transmitting at least some data required to authorize a fuel transaction once the IR data link with the fuel vendor is established.

The functions noted above are preferably implemented by at least one processor (such as a computing device implementing machine instructions to implement the specific functions noted above) or a custom circuit (such as an application specific integrated circuit).

This Summary has been provided to introduce a few concepts in a simplified form that are further described in detail below in the Description. However, this Summary is not intended to identify key or essential features of the claimed subject matter, nor is it intended to be used as an aid in determining the scope of the claimed subject matter.

DRAWINGS

Various aspects and attendant advantages of one or more exemplary embodiments and modifications thereto will become more readily appreciated as the same becomes better understood by reference to the following detailed description, when taken in conjunction with the accompanying drawings, wherein.

Figure 1A:
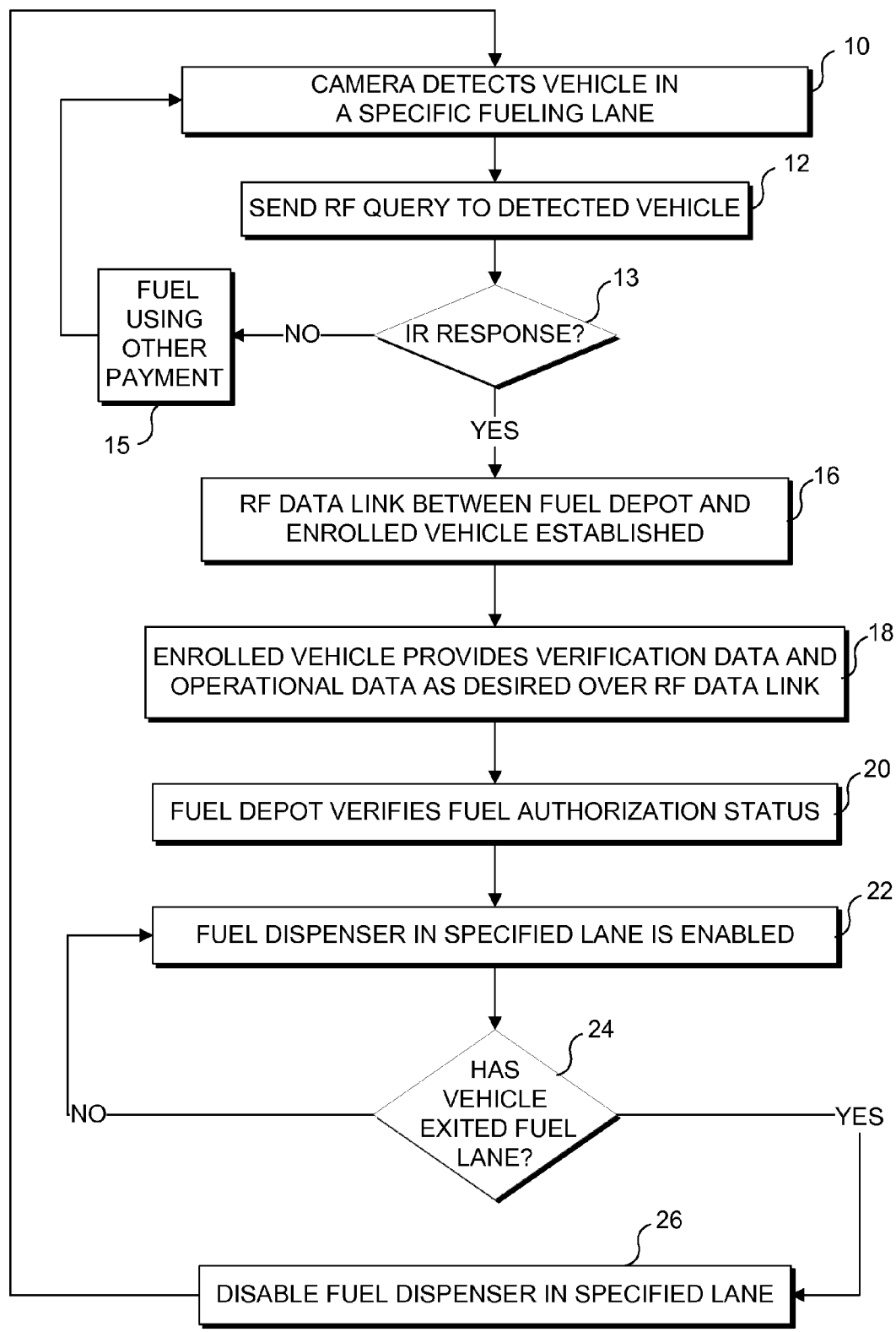
FIG. 1A is a logic diagram showing exemplary method steps implemented in a second exemplary embodiment for implementing a fuel authorization method in which an IR data link is required.
Figure 1B:
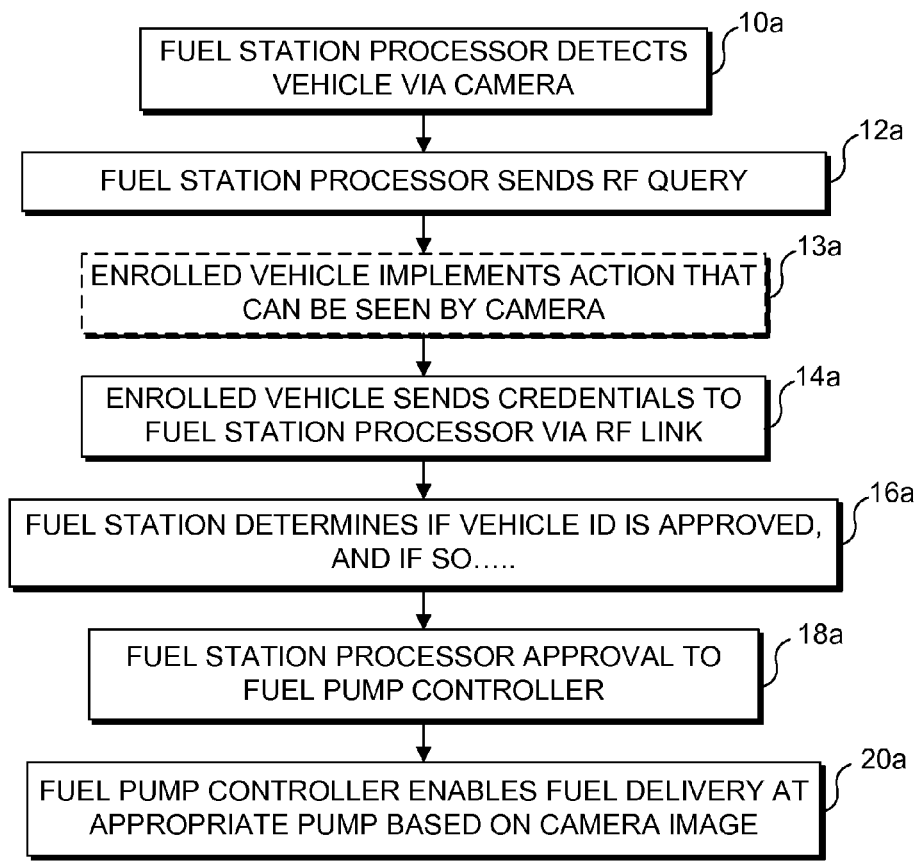
FIG. 1B is a logic diagram showing exemplary method steps implemented in a second exemplary embodiment for implementing a fuel authorization method in which an IR data link is not required.
Figure 2:
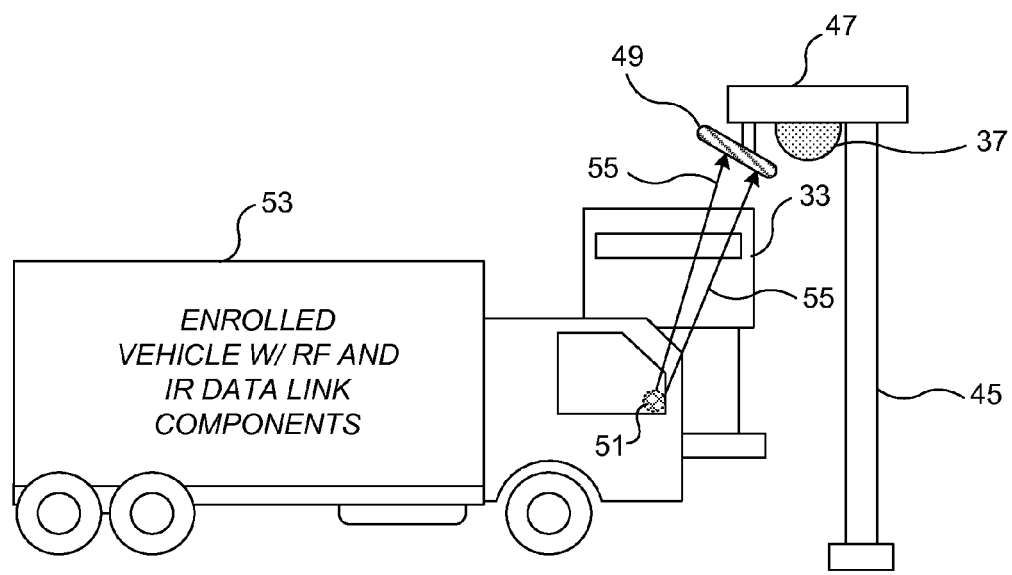
Figure 3:
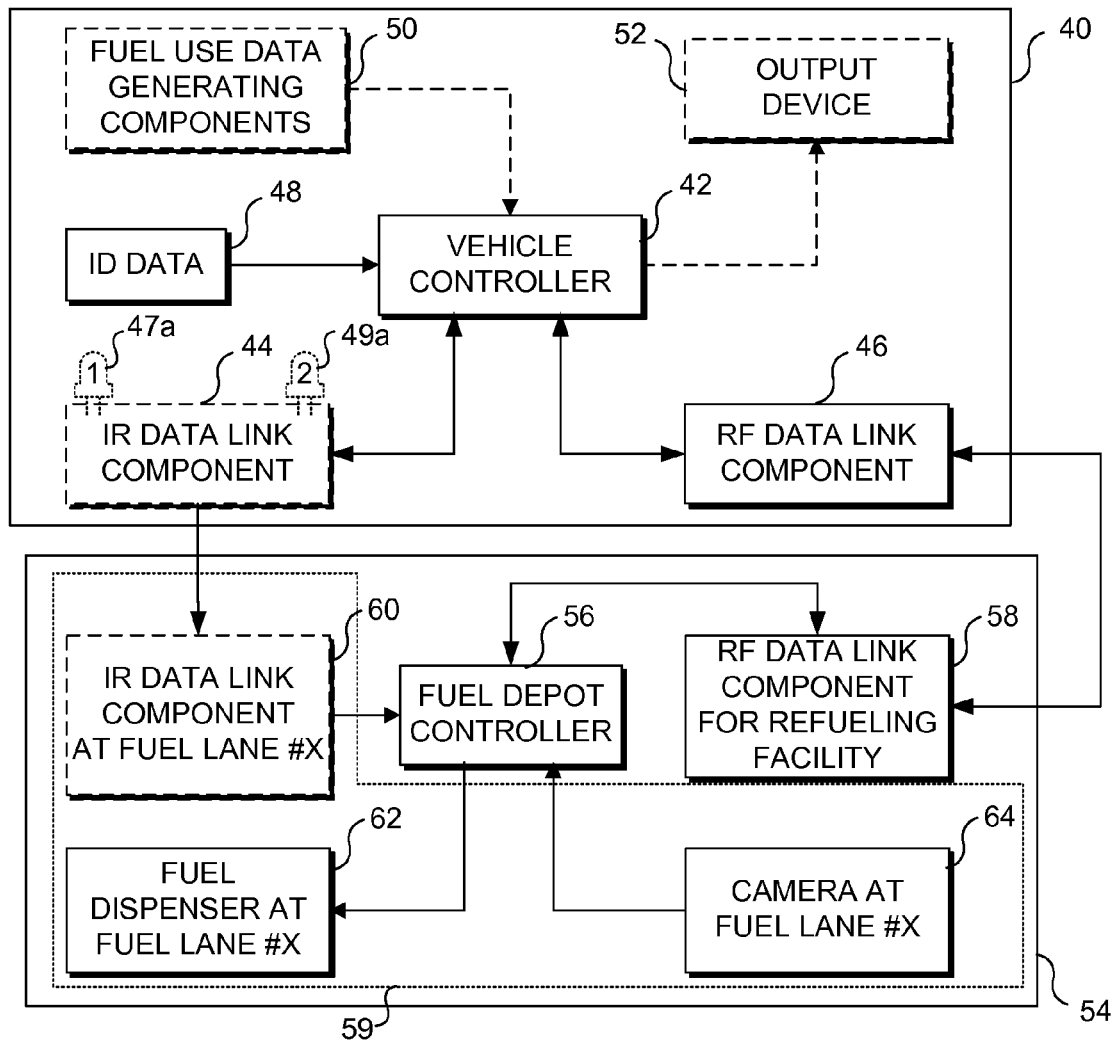
Figure 4:
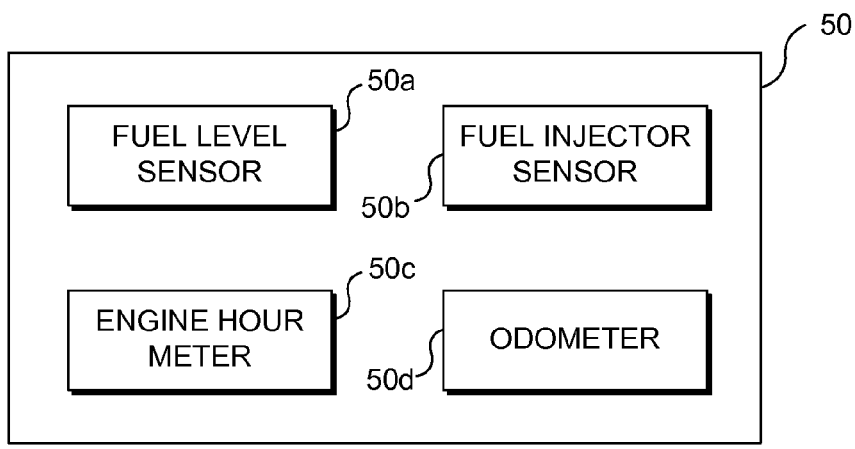
Figure 5:
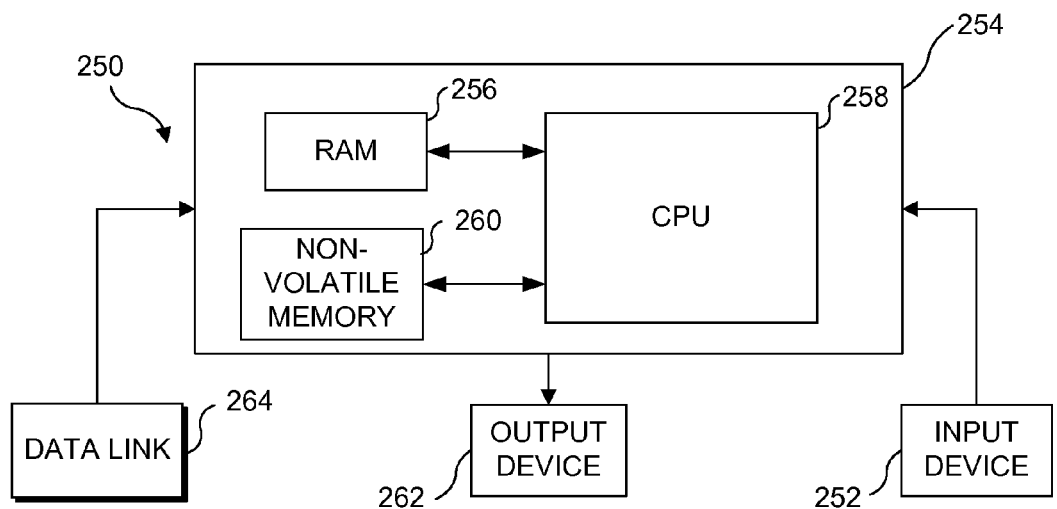
Figure 6:
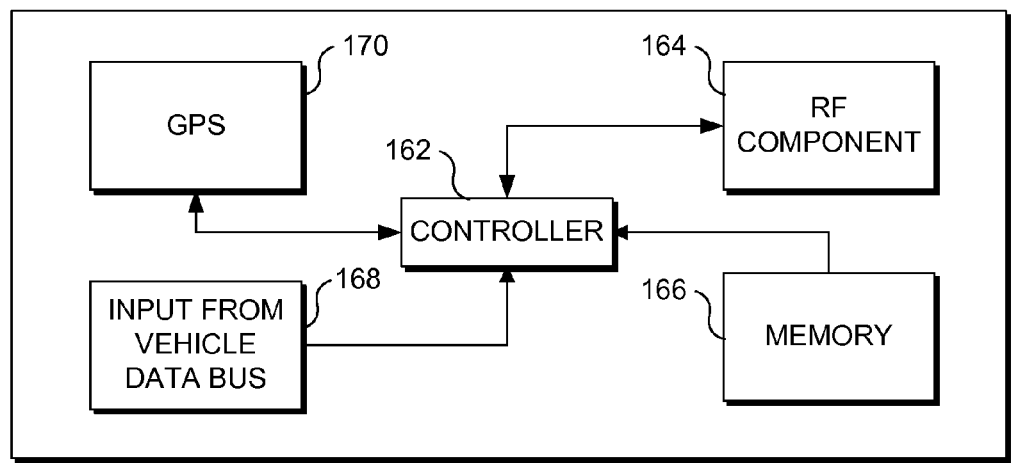
Figure 7:
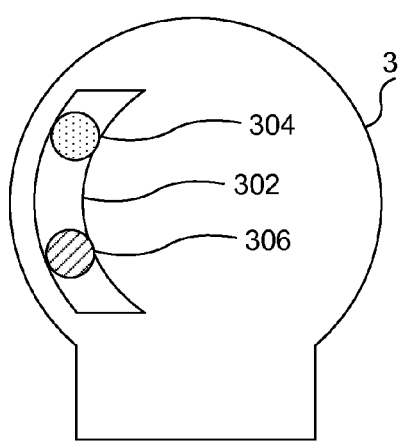
Figure 8:
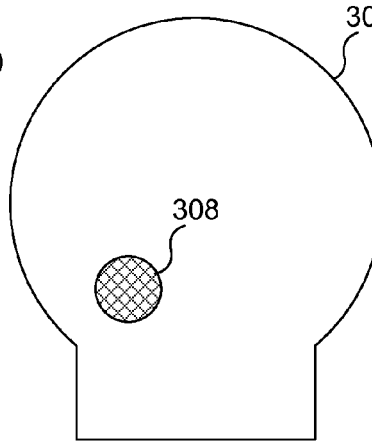
Figure 9:
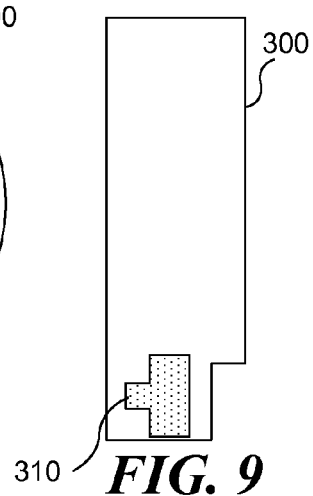
Figure 10:
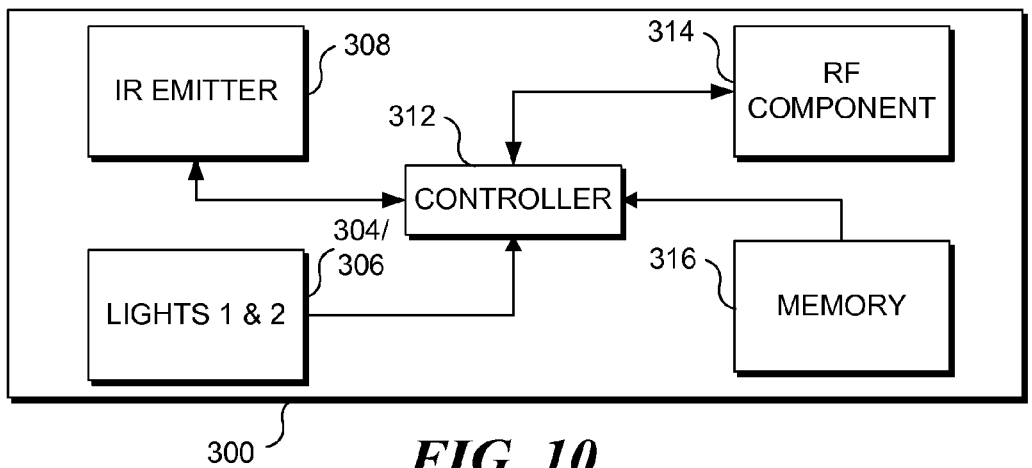
Figure 11:
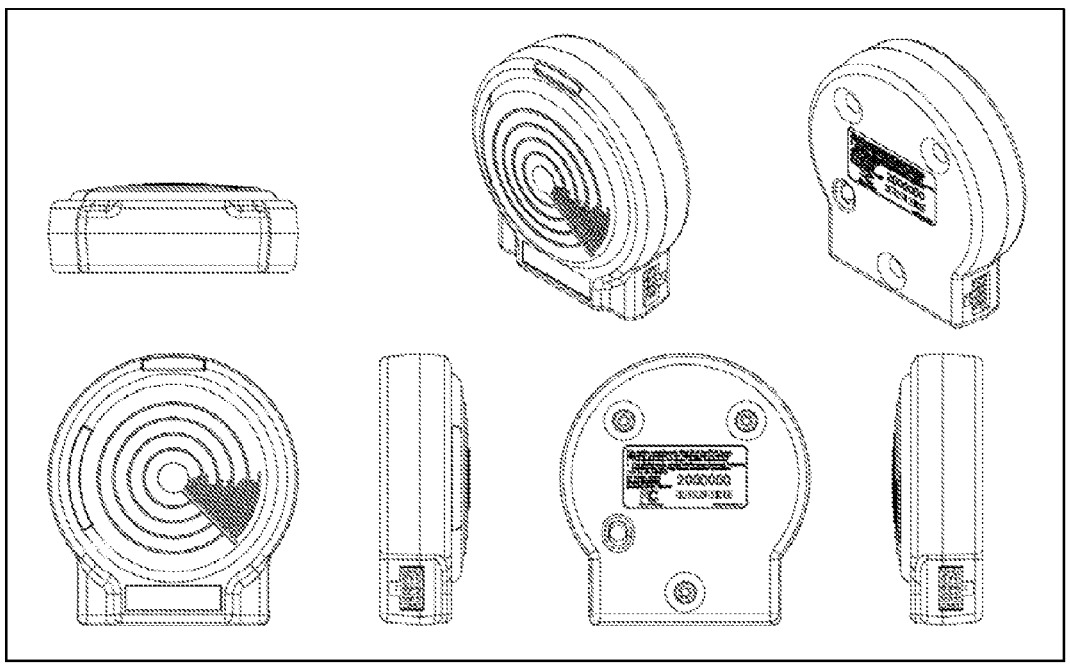
Figure 12:
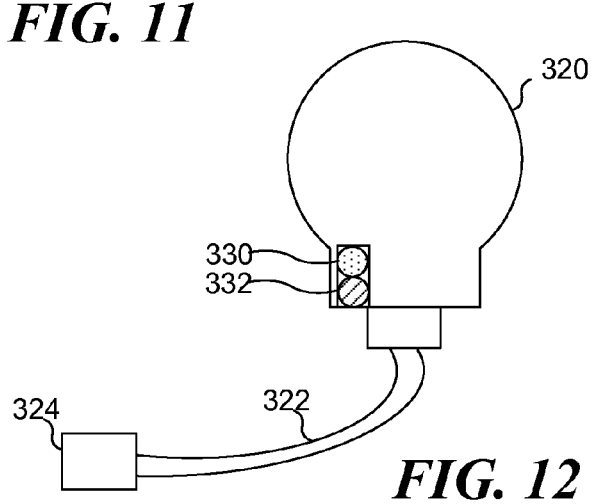
Figure 13:
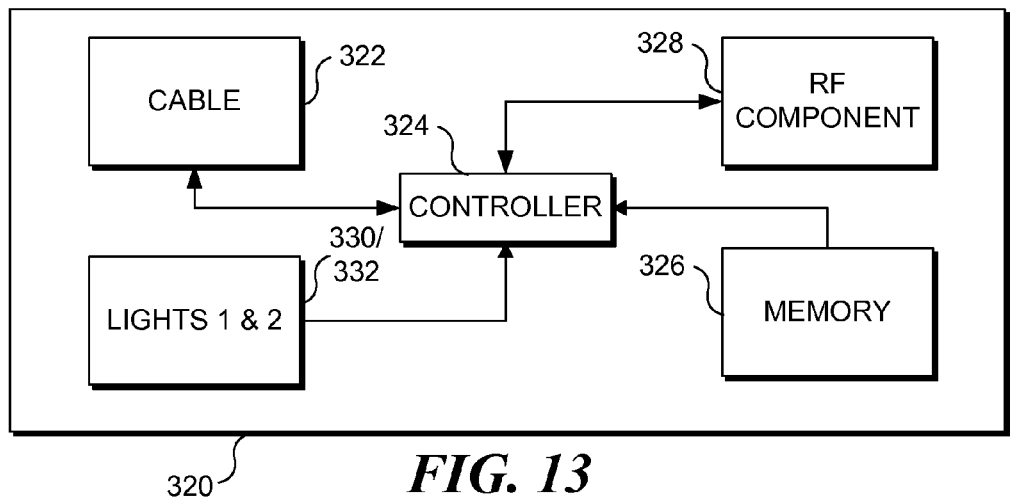
Figure 14:
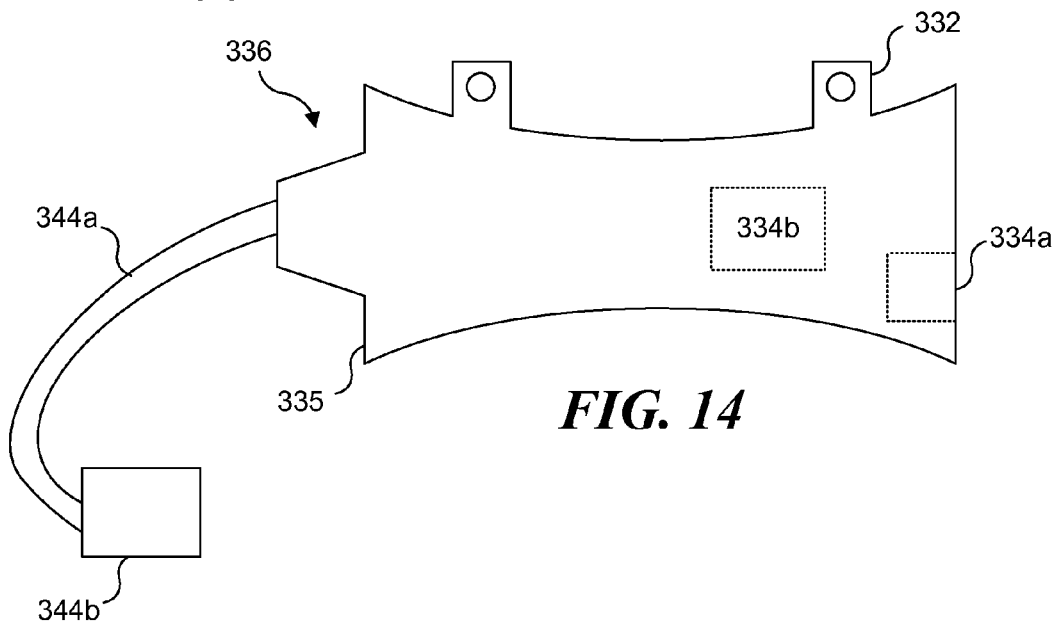
Figure 15:
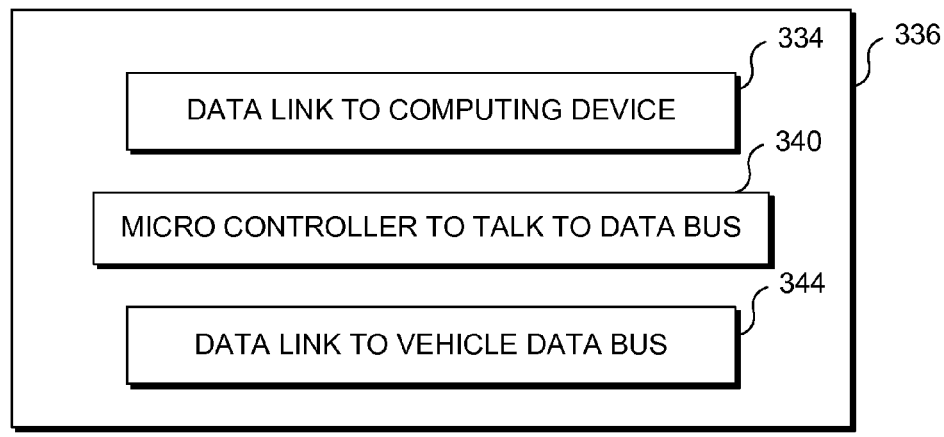
Figure 16:
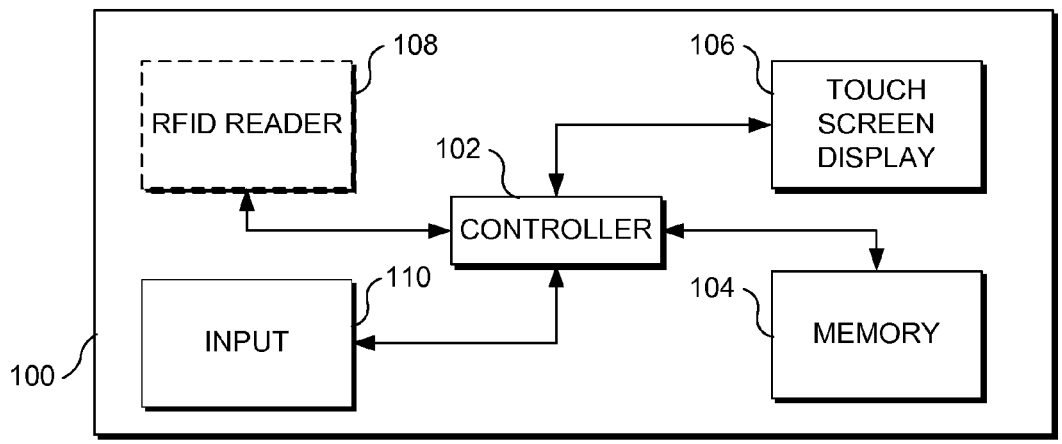
Figure 17:
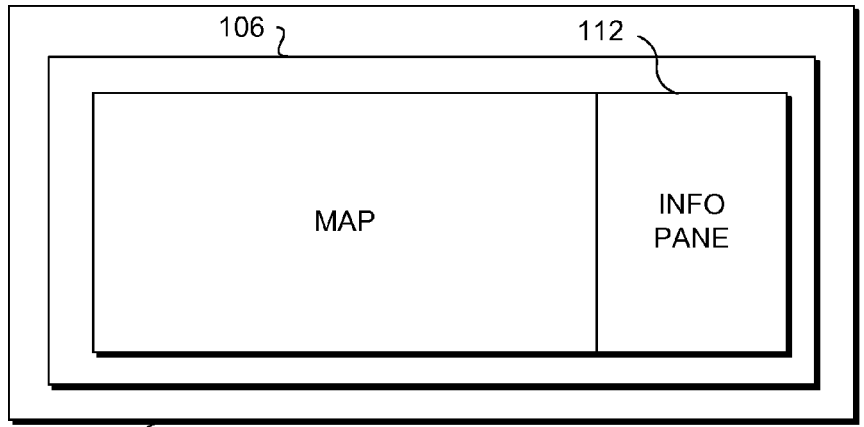
Figure 18:
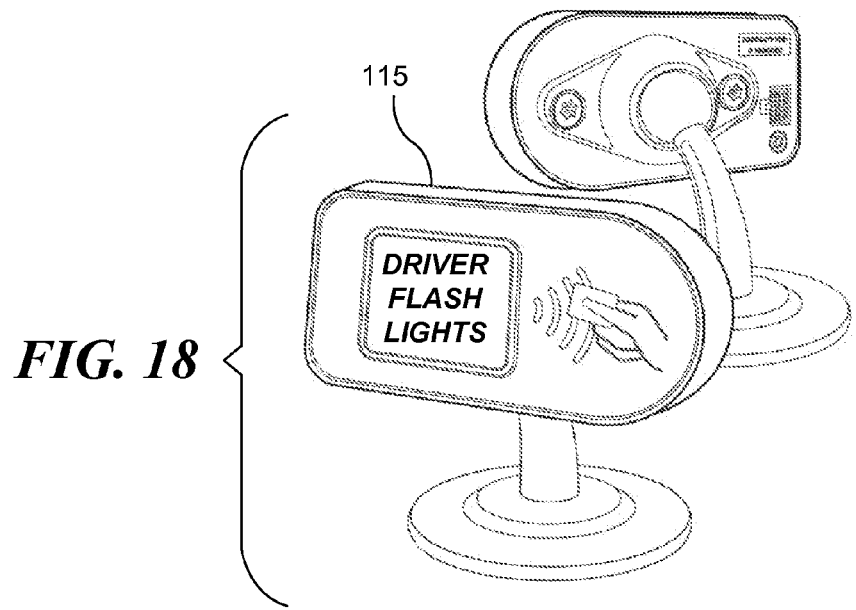

FIG. 2 schematically illustrates vehicle components and fuel island components used to implement the method steps of FIG. 1A;

FIG. 3 is an exemplary functional block diagram showing the basic functional components used to implement the method steps of FIGS. 1A and 1B;

FIG. 4 is an exemplary functional block diagram showing some of the basic functional components used to collect fuel use data from a vehicle;

FIG. 5 is a functional block diagram of an exemplary computing device that can be employed to implement some of the method steps disclosed herein;

FIG. 6 is a functional block diagram of an exemplary telematics device added to an enrolled vehicle in one or more of the concepts disclosed herein;

FIG. 7 is a front elevation of an exemplary device (referred to herein as a truck board device and/or puck) implementing the RF and IR components that can be used in a vehicle enrolled in a fuel authorization program generally corresponding to the method of FIG. 1A, enabling alignment lights to be seen;

FIG. 8 is a rear elevation of the truck board device of FIG. 7, enabling an IR transmitter to be seen;

FIG. 9 is a side elevation of the truck board device of FIG. 7, enabling a hard wire data link port to be seen;

FIG. 10 is a functional block diagram showing some of the basic functional components used in the truck board device of FIG. 7;

FIG. 11 includes a plurality of plan views of a commercial implementation of the truck board device of FIG. 7;

FIG. 12 is a front elevation of an exemplary device (referred to herein as a reefer tag) that can be used in connection with the truck board device of FIG. 7 to either authorize fuel delivery to a refrigerated trailer pulled by a vehicle enrolled in a fuel authorization program generally corresponding to the method of FIG. 1, or to facilitate automated collected of fuel use data from a refrigerated trailer;

FIG. 13 is a functional block diagram showing some of the basic functional components used in the reefer tag of FIG. 12;

FIG. 14 is a rear elevation of an exemplary device (referred to herein as a J-bus cable or smart cable) that can be used to acquire vehicle data from a vehicle data bus, or selectively activate a vehicle system that can be observed by a camera in a fuel lane to unambiguously identify which pump to enable in an authorized fuel transaction, which in at least some embodiments is employed in a fuel authorization program;

FIG. 15 is a functional block diagram showing some of the basic functional components used in the J-bus cable/smart cable of FIG. 14;

FIG. 16 is a functional block diagram of an exemplary telematics oriented tablet for in vehicle use that may be employed in accord with some aspect of the concepts disclosed herein;

FIG. 17 is a functional block diagram of an exemplary telematics oriented tablet for in vehicle use implementing a navigation app that is presented to the driver during vehicle operation, such that an info pane is not consumed by the map portion, and any fuel authorization instructions from a fuel vendor to a driver can be visually presented to the driver on the info pane during a fuel authorization transaction; and FIG. 18 schematically illustrates an accessory display that can be used along with a processor in the vehicle to display any fuel authorization instructions from a fuel vendor during a fuel authorization transaction.

DESCRIPTION

Figures and Disclosed Embodiments are not Limiting

Exemplary embodiments are illustrated in referenced Figures of the drawings. It is intended that the embodiments and Figures disclosed herein are to be considered illustrative rather than restrictive. No limitation on the scope of the technology and of the claims that follow is to be imputed to the examples shown in the drawings and discussed herein. Further, it should be understood that any feature of one embodiment disclosed herein can be combined with one or more features of any other embodiment that is disclosed, unless otherwise indicated.

As used herein and in the claims that follow, the term camera should be understood to encompass hardware that can capture video and/or still images.

A fuel authorization system utilizing both IR and RF data links was originally disclosed in commonly owned patent titled METHOD AND APPARATUS FOR FUEL ISLAND AUTHORIZATION FOR THE TRUCKING INDUSTRY, Ser. No. 12/906,615, the disclosure and drawings of which are hereby specifically incorporated by reference.

Exemplary Fuel Authorization System Utilizing Cameras and RF Data Links

Various aspects of the concepts disclosed herein related to a fuel authorization system utilizing a camera and an RF data links, to ensure that fuel is authorized only at a fuel pump the enrolled vehicle is immediately adjacent to (i.e., to reduce the chance that fuel will be delivered to a non-enrolled vehicle at an adjacent fuel pump). In some embodiments an IR data link is further employed to unambiguously identify which one of a plurality of fuel pumps should be enabled. A high level overview of such a system is provided below.

The concepts disclosed herein are directed to a method to enable an operator of vehicle refueling stations to automatically authorize the refueling of a specific vehicle, such that once the authorization is provided, the fuel being dispensed cannot easily be diverted to a different vehicle. In an exemplary embodiment, a camera detects a vehicle moving toward a fuel pump. A station fuel controller energizes an RF transmitter and sends an RF query to the vehicle. In embodiments where the camera itself is capable of unambiguously identifying which one of a plurality of fuel pumps should be enabled, no IR data link is required. In embodiments where either the camera alone is not able to unambiguously identify which one of a plurality of fuel pumps should be enabled, or a vendor wants an additional level of assurance that the wrong fuel pump will not be energized, an IR data link can be used to unambiguously identify which one of a plurality of fuel pumps should be enabled (in such embodiments, an IR receiver is mounted at a location where an IR signal will be received only from a vehicle in a particular fuel lane, or the camera can detect the IR signal from the vehicle and use that signal to determine which fuel pump to activate if fuel authorization is approved).

In an exemplary embodiment, when a camera detects that a vehicle has entered the refuel lane, a radiofrequency (RF) transmitter proximate the fuel island pings (i.e., transmits a query to) the vehicle indicating that the camera detected the vehicle entering the fuel island. If the vehicle is enrolled in the fuel authorization program, the vehicle will have an RF receiver and transmitter that can communicate with the RF receiver/transmitter associated with the fuel island. It is recognized that an RF transmission, even if at relatively low power and short range, is likely to carry over a wider range than simply the distance between a vehicle in a refuel lane and a fuel dispenser serving that fuel lane. Accordingly, either an additional wireless data link is established using infrared (IR) transmitters and receivers, which are more directional than RF communication (and when low power light emitting diodes are used as an IR source, the IR transmission can have a short range), or the image from the camera itself is used to determine which fuel pump to activate. In embodiments relying on IR data link to unambiguously identify which one of a plurality of fuel pumps should be enabled, the enrolled vehicle, in response to an RF query from the fuel island, will respond by directing an IR-based communication toward the fuel island. The IR receiver associated with each refuel lane is positioned such that the IR receiver will only be able to receive an IR signal from an IR transmitter actually positioned in that specific refuel lane, verifying that the enrolled vehicle responding to the fuel island's RF query is really the vehicle in the refuel lane for which the RF query originated. Once the location of the enrolled vehicle is confirmed, RF communication between the fuel island (or the fuel vendor operating the fuel island, in embodiments where the RF component is not located on the fuel island) is enabled, and the enrolled vehicle provides identification data to the fuel island. The vehicle's identification data are unique to that specific vehicle.

In other exemplary embodiments, the IR data link is not required, because the image from the camera itself can unambiguously identify which one of a plurality of fuel pumps should be enabled, and the RF data link between the fuel vendor and the enrolled vehicle is initiated after the camera detects movement near the fuel island.

The camera/RF data link authorization paradigm disclosed herein can be used to enable gates, as well as fuel pumps, to be automatically activated, thus an enrolled vehicle can use the fuel authorization components to enter gated refueling stations, further enhancing security.

FIG. 1A is a logic diagram showing exemplary method steps implemented in a second exemplary embodiment for implementing a fuel authorization method in accord with the concepts disclosed herein. In a block 10, a vehicle is detected moving into an empty fuel lane using a video camera. In some embodiments, only one fuel pump is present (some private fuel terminals don't have multiple fuel pumps), so there is no need to unambiguously identify which one of a plurality of fuel pumps should be enabled, and no IR data link is needed. However, some users will want to prevent the possibility that an enrolled vehicle and non-enrolled vehicle will be present at the same time, such that the enrolled vehicle uses the RF data link to authorize fuel to the non-enrolled vehicle. The camera would likely be able to sense both vehicles, but will not be able to determine from which vehicle the RF data link is established. The addition of the IR data link will prevent that from happening.

In a block 12, an RF query is generated to interrogate the detected vehicle. In a decision block 13, it is determined whether the detected vehicle has properly responded to the RF query by transmitting an IR response to an IR receiver disposed proximate the fuel dispenser (in some embodiments the camera is able to detect an IR signal and a separate IR receiver will not be required). In at least some embodiments, components are added to enrolled vehicles to help drivers determine if a vehicle is properly positioned to enable the IR transmission required for fuel delivery authorization. Referring once again to decision block 13, if no IR response has been received, the vehicle is either not enrolled or is improperly positioned, and fueling will not be enabled unless some other form of payment is made, as indicated in a block 15. If an appropriate IR response is received in decision block 13, then in a block 16, an RF data link between the fuel vendor and the detected vehicle is established, to facilitate further verification, as well as to enable the vehicle to convey operational and any additional data as desired. In a block 18, the vehicle uses the RF data link to convey verification data to the fuel vendor, along with any additional data desired. In a block 20, the fuel vendor verifies that the vehicle is authorized to participate in the fuel authorization program. Once the authorization is approved, the fuel dispenser to which the vehicle is adjacent is enabled in a block 22, and the enrolled vehicle can be refueled.

After the fuel dispenser has been enabled, the camera signal is monitored to determine if the enrolled vehicle has moved out of the fuel lane, as indicated in decision a block 24. If no motion (or no more than a predefined amount of motion consistent with adjusting the vehicle's position relative to the fuel dispenser to enable the fuel dispenser to better reach the authorized vehicle's fuel tanks) is detected, then the logic loops back to block 22, and the fuel dispenser remains enabled. If excessive motion (more than the predefined amount of motion consistent with adjusting the vehicle's position relative to the fuel dispenser to enable the fuel dispenser nozzle to more efficiently reach the authorized vehicle's fuel tanks) is detected, then in a block 26, the fuel dispenser is disabled. The process is repeated when another vehicle is detected entering the fuel lane. Note that the camera will allow a relatively large amount of movement before determining that the fuel pump needs to be disabled. In some embodiments, the system can be configured to keep the fuel pump enabled unless the camera detects another vehicle moving close to the fuel pump, which may indicate that someone is attempting to divert fuel from an authorized vehicle to an authorized vehicle.

Significantly, the method of FIG. 1A requires that the response from the vehicle to the RF query is an IR-based response. In contrast to using an RF data link to respond to the initial RF query, the use of an IR data link (which is directional in addition to short range) provides an additional level of assurance to the participants of the fuel authorization program that there will be no confusion as to which fuel dispenser is to be enabled for a specific participating vehicle (since a plurality of enrolled vehicles may be refueling at the same fueling vendor location at about the same time). It is believed that this additional assurance will lead to such an embodiment having greater potential acceptance in the market, by easing potential user fears that fuel authorizations will be misapplied.

Note that when an IR receiver at a particular fuel dispenser receives an IR transmission from an enrolled vehicle, the fuel vendor unambiguously knows which fuel dispenser should be enabled (if additional verification checks are successful). The IR transmission does not need to include any data at all, as receipt of the IR signal itself identifies the fuel dispenser that should be subsequently enabled. However, in many embodiments, some actual data will be conveyed over the IR data link. In at least some embodiments, the IR response from the vehicle will uniquely identify a specific vehicle. In an exemplary, but not limiting embodiment, the IR transmission includes the vehicle's VIN, sent in an unencrypted form. In other embodiments, the IR transmission includes a random string and a time variable. In this embodiment, to increase the speed of data transfer (recognizing that IR data transfer is not particularly fast), the initial RF query from the pump includes a random alphanumeric string of less than 17 digits (VINs generally being 17 digits, so the random string will be shorter, resulting in faster IR data transfer as compared to embodiments in which the IR response from the vehicle was based on transmitting the vehicle's VIN over the IR data link in response to the RF query from the fuel vendor). The vehicle will then reply to the fuel vendor's RF query by transmitting the less than 17 character random string via IR. The fuel island will only accept an IR return of the random string for a limited period of time (to prevent another party from eavesdropping and obtaining the random string, and attempting to use the random string themselves). The period of time can vary, with shorter time periods making it more difficult for another party to use the random string. In an exemplary but not limiting embodiment, the time period is less than five minutes, and in at least one embodiment is less than about 90 seconds, which should be sufficient for an enrolled vehicle to properly position itself relative to the IR receiver. In at least some embodiments, the IR data will include at least one data component that is obtained from a memory in the vehicle that is not readily removable, such that simply removing the IR transmitter from an enrolled vehicle and moving the IR transmitter to a non-authorized vehicle will not enable the non-authorized vehicle to receive fuel.

It should be noted that FIG. 1A applies to embodiments in which a fuel lane is equipped with an IR receiver and a camera, and embodiments where the camera itself is used as the IR receiver.

Certain of the method steps described above can be implemented automatically. It should therefore be understood that the concepts disclosed herein can also be implemented by a controller, and by an automated system for implementing the steps of the method discussed above. In such a system, the basic elements include an enrolled vehicle having components required to facilitate the authorization process, and a fuel vendor whose fuel lanes/fuel dispensers include components that are required to facilitate the authorization process as discussed above. It should be recognized that these basic elements can be combined in many different configurations to achieve the exemplary concepts discussed above. Thus, the details provided herein are intended to be exemplary, and not limiting on the scope of the concepts disclosed herein.

FIG. 1B is a logic diagram showing exemplary method steps implemented in a second exemplary embodiment for implementing a fuel authorization method in accord with the concepts disclosed herein, in which no IR transmission is required for the fuel authorization. In such an embodiment, there is some risk that an enrolled vehicle can use its RF data link to send fuel authorization credentials for a non-enrolled vehicle at the fuel pump (because the RF data link, even when using short range radio, can be implemented when the enrolled vehicle is at a location other than immediately next to the fuel tank. That risk can be minimized if the system is programmed not to allow fuel authorization if the camera detects more than one vehicle being present (not an undue burden for private fuel terminals, which receive much less traffic than commercial fuel stations), or if an optional additional step indicated in block 13a is implemented.

In a block 10a, a vehicle is detected moving into an empty fuel lane using a video camera. In some embodiments, only one fuel pump is present (some private fuel terminals don't have multiple fuel pumps), so there is no need to unambiguously identify which one of a plurality of fuel pumps should be enabled, and no IR data link is needed. However, some users will want to prevent the possibility of an enrolled vehicle and non-enrolled vehicle being present at the same time, such that the enrolled vehicle uses the RF data link to authorize fuel to the non-enrolled vehicle. The camera would likely be able to sense both vehicles, but will not be able to determine from which vehicle the RF data link is established. As noted above, that risk can be minimized if the system is programmed not to allow fuel authorization if the camera detects more than one vehicle being present (not an undue burden for private fuel terminals, which receive much less traffic than commercial fuel stations), or if an optional additional step indicated in block 13a is implemented.

In a block 12a, a fuel station processor logically coupled to the camera automatically generates an RF query to interrogate the detected vehicle. In an optional block 13a, that query requires some response from the vehicle that can be detected by the camera. In at least one embodiment, a vehicle fuel authorization controller at the vehicle is logically coupled to a vehicle data bus and/or a vehicle controller, so that in response to the RF query from the station fuel authorization controller, the vehicle fuel authorization controller can automatically activate a vehicle system that can be seen by the camera. Exemplary such vehicle systems include but are not limited to turn signals, emergency flashers, headlights, running lights, and/or accessory equipment such as lifts, doors, booms, buckets, plows, etc. That light or equipment activation can be used to unambiguously identify the vehicle with which the RF data link has been established (which may be required if more than one fuel lane or more than one vehicle is present). In at least one embodiment, a vehicle fuel authorization controller at the vehicle is logically coupled to an aftermarket light element (i.e., the vehicle fuel authorization controller need not be coupled to the vehicle data bus, which is a more complicated installation procedure, but one that is required in embodiments where the fuel authorization credentials are dynamically retrieved from the vehicle data bus), so that in response to the RF query from the station fuel authorization controller, the vehicle fuel authorization controller can automatically activate the aftermarket light element so that it can be seen by the camera. The aftermarket light element can be incorporated a fuel authorization component added to the vehicle (which may also include the RF data link and the vehicle fuel authorization controller), or may be a discrete component. In still another embodiment, the enrolled vehicle will include either a mobile tablet or an accessory display logically coupled to the vehicle fuel authorization controller, which is programmed to use the display to prompt a driver of the vehicle to take some action that can be detected by the camera in response to the RF query from the station fuel authorization controller. Such actions include, but are not limited to activating a vehicle system, including but are not limited to turn signals, emergency flashers, headlights, running lights, and/or accessory equipment such as lifts, doors, booms, buckets, plows, etc. The driver can also be promoted to perform some other action that can be detected by the camera, such as exiting the vehicle and standing in a particular location for a defined period of time (such as a front of the vehicle), where such motion is unusual in a normal refueling operation. Other such actions that can be detected by the camera include opening and closing the driver door without exiting the vehicle, moving the vehicle forward then backward, or moving the vehicle in a predefined pattern. In some embodiments, a plurality of actions are defined, and then randomly chosen, so people wanting to spoof the system can't predict the action. The actions can be output to the driver not only using a display, but audibly as well, using a speaker in the vehicle.

Referring now to a block 14a, the enrolled vehicle responds to the RF query from the fuel vendor by establishing an RF data link with the fuel vendor and sending fuel authorization credentials from the vehicle over the RF data link. In some embodiments operational and additional data conveyed as well. In at least one embodiment, the fuel authorization credentials include data (such as a VIN) that is dynamically retrieved from a vehicle data bus (to make the system harder to spoof by removing fuel authorization components from enrolled vehicles and placing them in non-enrolled vehicles). In a block 16a, the fuel vendor verifies that the vehicle is authorized to participate in the fuel authorization program. Once the authorization is approved, the approval is sent to a pump controller in a block 18a, and then the fuel dispenser to which the vehicle is adjacent is enabled in a block 20a. It should be noted that in some embodiments a station fuel authorization controller that processes the camera data, generates the RF query, and determines if the vehicle is authorized is the same controller as the pump controller of block 18a. In other embodiments, those functions are distributed across multiple controllers, some of which may be remote from the fuel terminal.

After the fuel dispenser has been enabled, the camera signal can be monitored to determine if the enrolled vehicle has moved out of the fuel lane, generally as indicated in block 24 of FIG. 1A. If no motion (or no more than a predefined amount of motion consistent with adjusting the vehicle's position relative to the fuel dispenser to enable the fuel dispenser to better reach the authorized vehicle's fuel tanks) is detected, then the fuel dispenser remains enabled. If excessive motion (more than the predefined amount of motion consistent with adjusting the vehicle's position relative to the fuel dispenser to enable the fuel dispenser nozzle to more efficiently reach the authorized vehicle's fuel tanks) is detected, then the fuel dispenser is disabled. The process is repeated when another vehicle is detected entering the fuel lane. Note that the camera will allow a relatively large amount of movement before determining that the fuel pump needs to be disabled. In some embodiments, the system can be configured to keep the fuel pump enabled unless the camera detects another vehicle moving close to the fuel pump, which may indicate that someone is attempting to divert fuel from an authorized vehicle to an authorized vehicle.

Significantly, the method of FIG. 1B does not requires that the response from the vehicle to the RF query be an IR-based response. Where optional block 13a is not implemented, only the RF response is required. Optional block 13a discloses techniques other than the IR data link to unambiguously define which one of a plurality of different pumps needs to be activated (generally only an issue if the camera can see two vehicles).

Figure 1C:
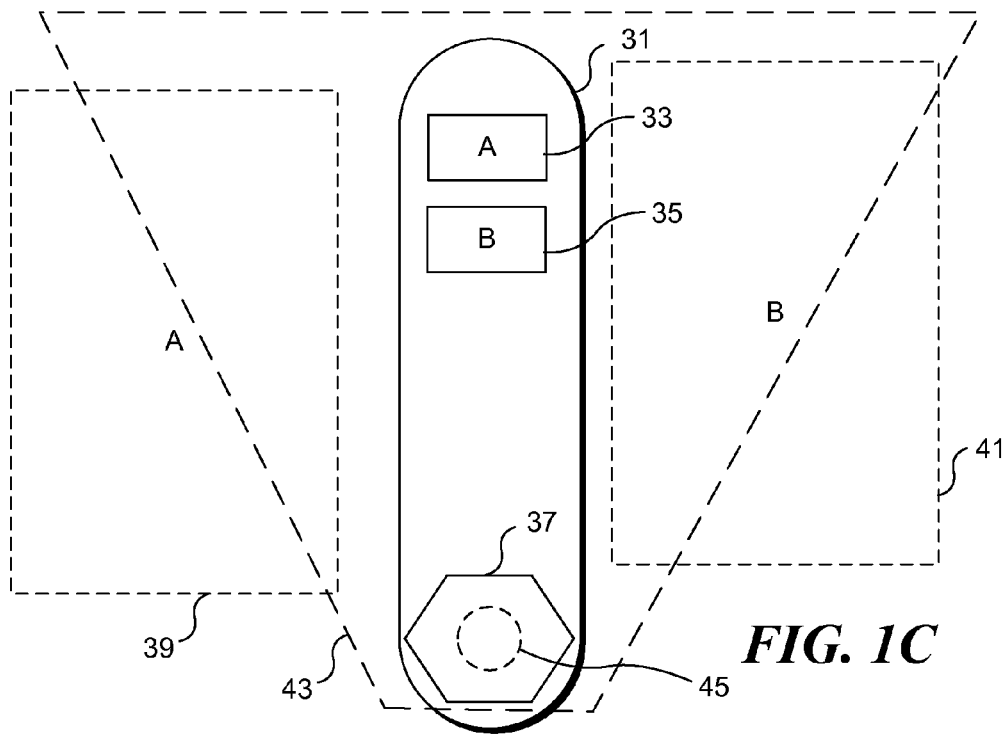
FIG. 1C is a plan view of an exemplary fuel island in which a pole mounted camera has a field of view that includes two different fuel lanes.

FIG. 1C is a plan view of a fuel terminal including two fuel pumps with a pole mounted camera implementing the concepts disclosed herein. A fuel pump 33 and a fuel pump 35 are positioned on a fuel island 31. Fuel pump 33 is designed to dispense fuel to a vehicle generally positioned in a location 39, and fuel pump 35 is designed to dispense fuel to a vehicle generally positioned in a location 41. A camera 37 is mounted to a pole 45, and has a field of view 43 that covers location 41 and location 39. The relative position of pole 45 is exemplary, and many other locations are possibly so long as the camera is positioned so that locations 39 and 41 are in the cameras field of view.

In some embodiments, the RF component used by the station fuel authorization controller is also mounted to pole 45. In some embodiments, camera 37 and the RF component share a common housing. In some embodiments, the station fuel authorization controller itself is mounted to pole 45. In some embodiments, camera 37, the RF component and the station fuel authorization controller share a common housing.

In some embodiments, the camera can communicate to the station fuel authorization controller whether a vehicle is present in location 39 or location 41. In such embodiments, if 2 vehicles are present (one at location 39 and one at location 41), and the camera can also receive an IR transmission from the vehicle, then that information unambiguously identifies whether the vehicle at location 39 or the vehicle at location 41 has established the RF data link with the fuel vendor (assuming both vehicles are not enrolled. Even if both vehicles are enrolled, the relative timing of the establishment of the data links will in most cases enable a conclusive determination to be made as to which is the proper fuel pump to enable. It should be recognized that if the camera is intended to respond to an IR transmission from the vehicle, that care must be taken in defining where the IR transmitter needs to be placed on the vehicle, and where the camera needs to be positioned, so that an IR data link can be established when a vehicle is at location 39 or location 41.

In some embodiments, where a vehicle is present in location 39 and another vehicle is at location 41, the camera signal is monitored to detect one of the actions discussed above in connection with block 13a of FIG. 1B, to unambiguously identifies whether the vehicle at location 39 or the vehicle at location 41 has established the RF data link with the fuel vendor (i.e., the data link over which the instructions from the fuel vendor to implement the specific action camera monitors for).

In at least some embodiments, the camera is used to take a picture of each vehicle involved in an authorized fuel transaction. In some embodiments, the camera is controlled such that a picture of the vehicles license plate is captured, even if that means taking a picture when the vehicle leaves. The picture will be stored along with other information about the fuel transaction. Later analysis of such images can be used to detect fraud. In at least some embodiments, the camera is used to take a picture of each vehicle that attempts to request an authorized fuel transaction, which is denied. Later analysis of such images can be used to detect fraud.

Figure 1D:
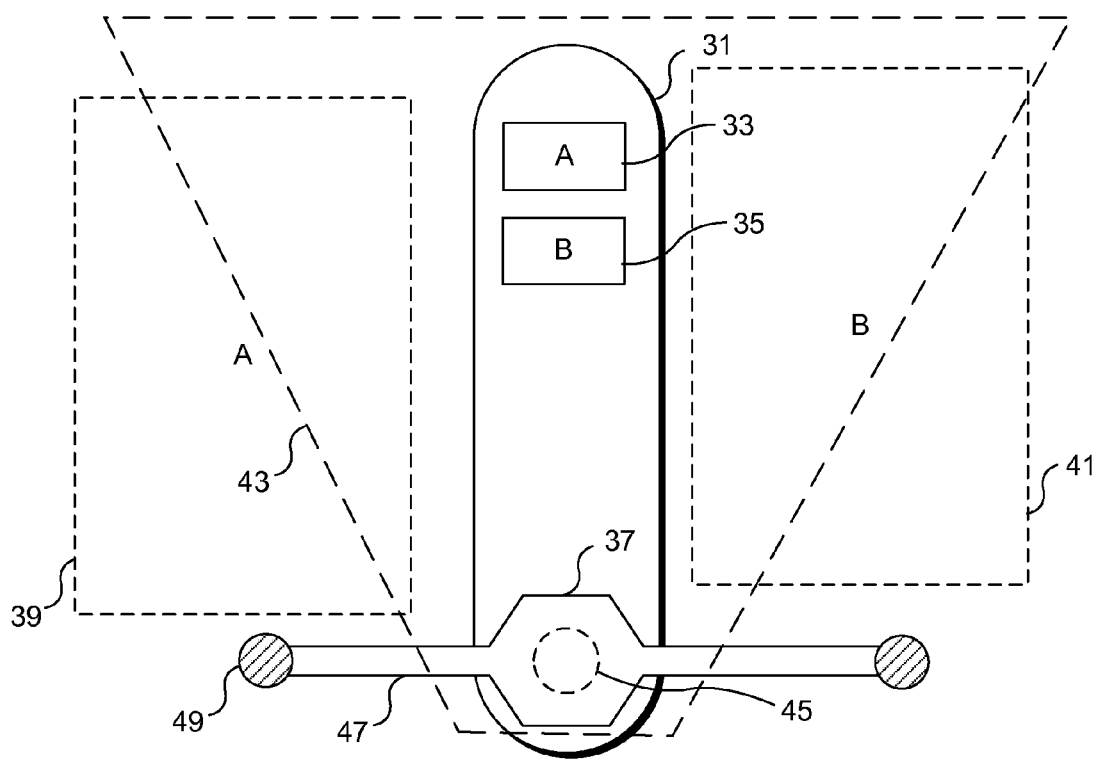
FIG. 1D is a plan view of an exemplary fuel island in which a pole mounted camera has a field of view that includes two different fuel lanes, and includes a boom enabling dedicated IR receivers to be positioned over each fuel lane, for embodiments in which the camera itself is not used as the IR receiver.

FIG. 1D is a plan view of a fuel terminal including two fuel pumps with a pole mounted camera that has been modified to include a boom 47 used to position an IR receiver over locations 39 and 41, so that the IR receiver is properly positioned near a front of a vehicle, to capture an IR transmission emitted outwardly and upwardly from the enrolled vehicle. The specific configuration of boom 47 is exemplary, and other configurations can be used to ensure that when an enrolled vehicle is aligned with a pump to receive fuel, the IR data link can be established.

FIG. 2 schematically illustrates vehicle components and fuel island components used to implement the method steps of FIG. 1A. Note that FIG. 2 is a side view of pump 33 of FIG. 1D. The fuel island participating in the fuel authorization program includes pole 45, camera 37, boom 47, and an IR receiver 49 positioned such that the IR receiver can capture an IR transmission emitted upwardly and outwardly from an IR transmitter 51 in an enrolled vehicle 53, generally as indicated by arrows 55. Not specifically shown are the RF component and the processor in either the vehicle or fuel station. As enrolled vehicle 53 enters the fuel lane, camera 37 detects the vehicle. The RF query is initiated as discussed above, and an IR transmitter 51 on the vehicle conveys IR data to IR receiver 49 (note that transmitter 51 and receiver 49 are generally aligned when the cab of the vehicle is aligned with the fuel dispenser). As shown in FIG. 2, the IR receiver is located on boom 47 above the vehicle. It should be recognized that such a location is exemplary, and not limiting. In a particularly preferred, but not limiting embodiment, each fuel authorization element disposed at the fuel island is contained in a common housing attached to pole 45 (in at least one exemplary embodiment, this common housing contains the camera, the IR receiver, the RF component, and the fuel island processor). Note that in embodiments in which the IR receiver is over the fuel island, the IR transmitter in the vehicle can direct the IR beam upwardly through the windshield of the vehicle. This configuration minimizes IR signal noise, as ambient light (such as reflected sunlight) is less likely to be received by the IR receiver. With respect to facilitating an alignment between the IR transmitter and the IR receiver, various techniques, including the lights disposed on a fuel authorization component in the vehicle, can be used to help the driver make sure the IR receiver and IR transmitter are aligned. In one embodiment, paint stripes in the fuel island can provide visual references to the driver, so the driver can ensure that the IR receiver and IR transmitter are aligned. As noted above, in at least one exemplary embodiment, the IR transmitter is placed proximate the windshield of the vehicle so the IR beam can pass through the windshield glass. If the fuel island includes a dedicated RF component and processor, those elements can be placed in many different alternative locations on the fuel island. As noted above, in at least one exemplary embodiment, such elements are placed in a common housing, along with camera 37.

FIG. 3 is an exemplary functional block diagram showing the basic functional components used to implement the method steps of FIG. 1A (with the option IR component, or the method of FIG. 1B w/o IR)o. Shown in FIG. 3 are an enrolled vehicle 40 and a refueling facility 54. Vehicle 40 includes a vehicle controller 42 implementing functions generally consistent with the vehicle functions discussed above in connection with FIGS. 1A and 1B (noting that if desired, such functions could be implemented using more than a single controller), an optional IR data link component 44 (i.e., an IR emitter, for embodiments requiring IR), an RF data link component 46 (i.e., an RF transmitter and an RF receiver, implemented as a single component or a plurality of separate components), and a memory 48 in which vehicle ID data (and/or fuel authorization verification data) are stored (noting that in some exemplary embodiments, the memory in which such data are stored is not part of a required fuel authorization component, such as a telematics unit that is added to enrolled vehicles, such that removal of the added component alone is insufficient to enable the removed component to be used in a non-authorized vehicle to participate in the fuel authorization program), each such component being logically coupled to controller 42. In an exemplary embodiment, the IR data link component includes two lights 47 and 49, whose functions are discussed below. Vehicle 40 may also include an optional output device 52 that can be used to provide feedback or instructions relevant to the fuel authorization program to the vehicle operator (i.e., see block 13a of FIG. 1B), and fuel use data generating components 50 (i.e., components that collect data that can be used to calculate an amount of fuel used by the vehicle). Each optional component is logically coupled to the vehicle controller.

Refueling facility 54 includes a fuel depot controller 56 implementing functions generally consistent with fuel vendor functions discussed above in connection with FIGS. 1A and 1B (noting that if desired, such functions could be implemented using more than a single controller) and an RF data link component 58 (i.e., an RF transmitter and an RF receiver, implemented as a single component or a plurality of separate components) logically coupled to controller 56. Refueling facility 54 will likely include a plurality of fuel lanes, including at least one fuel lane 59. Each fuel lane participating in the fuel authorization program includes an IR data link component 60 (i.e., an IR receiver, for embodiments in which a discrete IR receiver is employed, noting that in at least some embodiments the camera element can be used to detect IR, and no separate IR component is required) disposed proximate to a fuel dispenser 62, and a video camera 64, each of which is logically coupled to controller 56. Note in at least some embodiments, a single camera can serve multiple fuel lanes (see FIGS. 1C and 1D). Note that controller 56 and RF component 58 of refueling facility 54 are intended to support a plurality of different fuel lanes participating in the fuel authorization program. As discussed below, the concepts disclosed herein also encompass embodiments where each participating fuel lane includes its own RF component and processor component.

To recap the functions implemented by the various components in the enrolled vehicle and the refueling facility in the exemplary fuel authorization method of FIG. 1A, as the enrolled vehicle enters a fuel lane participating in the fuel authorization program, camera 64 detects the vehicle, and processor 56 uses RF component 58 to send an RF query to the vehicle. The RF query is received by RF component 46 in an enrolled vehicle, and vehicle controller 42 responds by causing IR component 44 to transmit an IR response to IR component 60. An RF data link between the enrolled vehicle and the fuel vendor is thus established using RF components 46 and 58. ID data (such as a VIN) uniquely identifying the vehicle is acquired from memory 48 and conveyed to controller 56 using one or both of the IR and RF data links. In some embodiments, passwords or encryption keys are also stored in memory 48 and are used to confirm that the vehicle is enrolled in the fuel authorization program. Once the enrolled vehicle's status in the fuel authorization program is confirmed, controller 56 enables operation of fuel dispenser 62 (so long as sensor 64 indicates that the enrolled vehicle has not exited the fuel lane). It should be noted that if controller 56 and RF component 58 are used to support a plurality of different fuel islands participating in the fuel authorization program, then RF component 58 will need to have sufficient range, power, and bandwidth to support simultaneous operations with a plurality of fuel islands.

The function of optional lights 47 and 49 will now be discussed. IR data from IR component 44 is highly directional, and successful IR data transmission requires alignment between IR component 44 in the vehicle and IR component 60 in the fuel lane. A first light 47 is used to indicate to the driver of the vehicle that an IR data link has been established. A second light 49 is used to indicate to the driver of the vehicle that the IR data transmission is complete, such that if the vehicle needs to be moved relative to the fuel dispenser to enable the fuel dispenser to reach the vehicle's fuel tanks, the movement can be implemented without interrupting the IR data transmission. It should be recognized that other techniques (such as the use of a visual display, or audible prompts via output device 52) could similarly be used to convey corresponding information to the vehicle operator. Note that in embodiments employing such indicator lights, the IR data link need not be active during the refueling operation (i.e., the IR data link need only be operational long enough to establish the RF data link between the fuel vendor and the vehicle). In other embodiments, the IR data link is operational during refueling, to ensure that the vehicle remain at the fuel island during refueling, so no fuel can be diverted to an unauthorized vehicle.

As noted above, in at least some embodiments, controller 42 also uses the RF data link between the vehicle and the refueling facility to transfer data other than that needed to verify that the enrolled vehicle is authorized to participate in the fuel authorization program. This additional data can include without any implied limitation: fault code data, vehicle performance and/or fuel efficiency and consumption data, and driver data (such as driver ID and the driver's accumulated hours for compliance and payroll). A potentially useful type of additional data will be fuel use data collected by components 50. FIG. 4 is a functional block diagram showing some exemplary components used to collect fuel use data, including a fuel tank level sensor 50a (indicating how much fuel is stored in the vehicle's fuel tanks before refueling), fuel injectors sensors 50b (configured to determine how much fuel has passed through the engine fuel injectors, indicating how much fuel has been consumed by the vehicle), an engine hour meter 50c (configured to determine how many hours the vehicle's engine has been operated, which can be used in addition to or in place of the fuel injector data to determine how much fuel the vehicle has consumed), and an odometer 50d (configured to determine how many miles or kilometers the vehicle has traveled, which can be used in addition to or in place of the fuel injector data (or engine hour data) to determine how much fuel the vehicle has consumed).

Referring to FIG. 3, it should be noted that in at least some embodiments, camera 64 can detect and IR signal and determine which from which fuel lane the IR signal has been emitted, thus unambiguously determining which fuel lane an enrolled vehicle is at (see FIG. 1C).

Exemplary Computing Device

Steps in the methods disclosed herein can be implemented by a processor (such as a computing device implementing machine instructions to implement the specific functions noted above) or a custom circuit (such as an application specific integrated circuit). FIG. 5 schematically illustrates an exemplary computing system 250 suitable for use in implementing certain steps in the methods of FIG. 1A (i.e., for executing at least blocks 10, 12, 13, 16, 20, 22, 24, and 26 of FIG. 1A). It should be recognized that different ones of the method steps disclosed herein can be implemented by different processors (i.e., implementation of different ones of the method steps can be distributed among a plurality of different processors, different types of processors, and processors disposed in different locations). Exemplary computing system 250 includes a processing unit 254 that is functionally coupled to an input device 252 and to an output device 262, e.g., a display (which can be used to output a result to a user, although such a result can also be stored for later review or analysis). Processing unit 254 comprises, for example, a central processing unit (CPU) 258 that executes machine instructions for carrying out at least some of the various method steps disclosed herein, such as establishing, processing, or responding to RF or IR signals, as well as processing and/or storing video data. The machine instructions implement functions generally consistent with those described above (and can also be used to implement method steps in exemplary methods disclosed hereafter). CPUs suitable for this purpose are available, for example, from Intel Corporation, AMD Corporation, Motorola Corporation, and other sources, as will be well known to those of ordinary skill in this art.

Also included in processing unit 254 are a random access memory (RAM) 256 and non-volatile memory 260, which can include read only memory (ROM) and may include some form of memory storage, such as a hard drive, optical disk (and drive), etc. These memory devices are bi-directionally coupled to CPU 258. Such storage devices are well known in the art. Machine instructions and data are temporarily loaded into RAM 256 from non-volatile memory 260. Also stored in the non-volatile memory may be an operating system software and other software. While not separately shown, it will be understood that a generally conventional power supply will be included to provide electrical power at voltage and current levels appropriate to energize computing system 250.

Input device 252 can be any device or mechanism that facilitates user input into the operating environment, including, but not limited to, one or more of a mouse or other pointing device, a keyboard, a microphone, a modem, or other input device. In general, the input device might be used to initially configure computing system 250, to achieve the desired processing (i.e., to compare subsequently collected actual route data with optimal route data, or to identify any deviations and/or efficiency improvements). Configuration of computing system 250 to achieve the desired processing includes the steps of loading appropriate processing software into non-volatile memory 260, and launching the processing application (e.g., loading the processing software into RAM 256 for execution by the CPU) so that the processing application is ready for use. Output device 262 generally includes any device that produces output information, but will typically comprise a monitor or display designed for human visual perception of output. Use of a conventional computer keyboard for input device 252 and a computer monitor for output device 262 should be considered as exemplary, rather than as limiting on the scope of this system. Data link 264 is configured to enable data collected in connection with operation of a fuel authorization program to be input into computing system 250. Those of ordinary skill in the art will readily recognize that many types of data links can be implemented, including, but not limited to, universal serial bus (USB) ports, parallel ports, serial ports, inputs configured to couple with portable memory storage devices, FireWire ports, infrared data ports, wireless data communication such as Wi-Fi and Bluetooth™, network connections via Ethernet ports, and other connections that employ the Internet. Note that data from the enrolled vehicles will typically be communicated wirelessly (although it is contemplated that in some cases, data may alternatively be downloaded via a wire connection).

It should be understood that the term "computer" and the term "computing device" are intended to encompass networked computers, including servers and client device, coupled in private local or wide area networks, or communicating over the Internet or other such network. The data required to implement fuel authorization transactions can be stored by one element in such a network, retrieved for review by another element in the network, and analyzed by any of the same or yet another element in the network. Again, while implementation of the method noted above has been discussed in terms of execution of machine instructions by a processor (i.e., the computing device implementing machine instructions to carry out the specific functions noted above), at least some of the method steps disclosed herein could also be implemented using a custom circuit (such as an application specific integrated circuit).

Exemplary Telematics Device Including Position Sensing Component (GPS)

FIG. 6 is a functional block diagram of an exemplary telematics device added to an enrolled vehicle to implement some of the method steps of FIG. 1A (or optional step 13a of FIG. 1B), particularly providing verification data such a VIN from a non-removable memory in the vehicle, as well as providing additional data such as that defined in FIG. 4. With reference to FIG. 1B, note that such an exemplary telematics device may be logically coupled to a vehicle data bus, enabling vehicle systems to be activated in response to an RF query from a fuel vendor, to enable the camera at the fuel lane to unambiguously determine which fuel pump to enable if fuel authorization is approved. Also with reference to FIG. 1B, note that such an exemplary telematics device may include or be logically coupled to a display, enabling instructions to be provided to the driver from the fuel vendor, which when acted can be detected by the camera at the fuel lane to unambiguously determine which fuel pump to enable if fuel authorization is approved.

An exemplary telematics unit 160 includes a controller 162, a wireless data link component 164, a memory 166 in which data and machine instructions used by controller 162 are stored (again, it will be understood that a hardware rather than software-based controller can be implemented, if desired), a position sensing component 170 (such as a GPS receiver), and a data input component 168 configured to extract vehicle data from the vehicle's data bus and/or the vehicle's onboard controller.

Referring to FIG. 6, telematics unit 160 has capabilities exceeding those required for participating in a fuel authorization program. The additional capabilities of telematics unit 160 are particularly useful to fleet operators. Telematics unit 160 is configured to collect position data from the vehicle (to enable vehicle owners to track the current location of their vehicles, and where they have been) and to collect vehicle operational data (including but not limited to engine temperature, coolant temperature, engine speed, vehicle speed, brake use, idle time, and fault codes), and to use the RF component to wirelessly convey such data to vehicle owners. These data transmission can occur at regular intervals, in response to a request for data, or in real-time, or be initiated based on parameters related to the vehicle's speed and/or change in location. The term "real-time" as used herein is not intended to imply the data are transmitted instantaneously, since the data may instead be collected over a relatively short period of time (e.g., over a period of seconds or minutes), and transmitted to the remote computing device on an ongoing or intermittent basis, as opposed to storing the data at the vehicle for an extended period of time (hour or days), and transmitting an extended data set to the remote computing device after the data set has been collected. Data collected by telematics unit 160 can be conveyed to the vehicle owner using RF component 164.

In at least one embodiment, encryption keys or passwords required by the fuel authorization program are stored in memory 166, and are accessed during one or more of the fuel authorization methods discussed above. To prevent parties from stealing telematics unit 160 and installing the unit on a non-authorized vehicle and attempting to use the stolen telematics unit to acquire fuel from the fuel authorization program, in at least one exemplary embodiment, the passwords/encryption keys required for authorized refueling are changed from time-to-time. Thus, the stolen telematics unit can only be used to access the fuel authorization program for a limited time. Note that an even more secure system can be achieved by storing the encryption keys or passwords not in memory 166, but in some other memory that is not easily removed from the vehicle, such that moving telematics unit 160 from the enrolled vehicle to a non-authorized vehicle will not enable the non-authorized vehicle to participate in the fuel authorization program, because the required passwords/encryption keys are not available in the non-authorized vehicle. In at least one further embodiment, the telematics unit is configured to acquire the VIN or other ID number needed to participate in the fuel authorization program from a memory in the vehicle that is not part of the telematics unit. In such an embodiment, if a telematics unit is stolen and installed on a vehicle not enrolled in the fuel authorization program, when the stolen telematics unit acquires the new vehicle's VIN as part of the fuel authorization methods discussed above, that vehicle would not be allowed to refuel under the authorization program, because the new vehicle's VIN would not be recognized as corresponding to an enrolled vehicle. In at least one embodiment, each telematics unit has a unique serial number, and the fuel authorization program can check the vehicle ID number and the telematics ID number to determine if they are matched in the database before enabling fuel to be acquired under the fuel authorization program, to prevent stolen telematics units, or telematics units moved without authorization, to be used to acquire fuel.

In a similar embodiment, telematics unit 160 is configured to receive updated passwords/encryption keys via RF component 164, but such passwords/keys are not stored in the telematics unit (or a separate memory in the vehicle) unless the telematics unit acquires a VIN or ID number (from a memory on the vehicle that is not part of the telematics unit) that matches an ID conveyed along with the updated encryption key/password. This approach prevents stolen telematics units from acquiring updated passwords or encryption keys.

Truck Board/Puck

One aspect of the concepts disclosed herein is a truck board device (or puck, in reference to the shape of an exemplary implementation), i.e., a single component implementing the functions of the IR data link, the RF data link, and alignment lights discussed above that can be added to an enrolled vehicle to implement the methods of FIG. 1A or 1B, with the fuel lanes of FIGS. 1C, 1D, and 2. The puck is shown in various views in FIGS. 7-9. In at least some embodiments, the puck is coupled using a hard wire data connection into the exemplary telematics device of FIG. 6 (or the J-bus cable of FIG. 15), which in turn is coupled to a vehicle data bus, to enable a VIN to be acquired from the vehicle bus for fuel authorization programs where the vehicle VIN is part of the credentials required for fuel authorization. It should be understood that the puck can also be used in fuel authorization programs where the vehicle VIN in not required for fuel authorization, and in fuel authorization programs where no connection to the vehicle data bus is required.

The puck is intended to be placed on or near a windshield of a vehicle, so that the rear face of the puck is disposed in a facing relationship with the windshield, and an IR transmitter on the rear face of the puck can emit an IR beam outward and upward from the vehicle. A bracket (not shown) can be used to achieve the desired orientation. Such a configuration works well where the IR receiver at the fuel lane is disposed on a pole or canopy generally above the fuel pump. When mounted in such an orientation, the front face of the puck will be visible to the driver, so that he can see the alignment lights discussed in connection with FIG. 3, to ensure the vehicle is properly positioned to enable the IR data link to be established.

It should be noted that the concepts disclosed herein also encompass other puck designs (devices that include the IR transmitter and RF components, and firmware for participating in a fuel authorization program) where the IR transmitter in the puck is intended to transmit an IR bean in a different direction (i.e., to the side of the vehicle, toward an IR receiver mounted in a location other than a canopy or on a pole).

The following provides a summary of how the puck is used in at least one exemplary fuel authorization program. Once the vehicle arrives in a fuel lane, the camera detects the truck in the fuel lane and an RF component at the fuel lane sends an interrogation pulse to the vehicle in the fuel lane, asking for the vehicle to identify itself and confirm what pump it is next to. The puck (using a microcontroller in the puck) acquires the VIN or other unique vehicle ID from the vehicle data bus (via the telematics device of FIG. 6 in some embodiments, or via a smart cable (a simplified device without the cell modem or GPS component of FIG. 6, see FIG. 15 for the smart cable), as generally discussed in greater detail below). The puck sends the vehicle ID to the fuel pump (pump board) via the IR data link (received at the fuel vendor by the camera or a dedicated IR receiver). The pump board (a fuel authorization component at the fuel station that includes a processor and RF data link) then specifically queries the vehicle by VIN number, and an encrypted secure RF channel is opened between the pump board and the truck board (the puck). In at least one embodiment, the pump board is a single component combining the IR data link, the RF data link, a controller, and the camera in a single housing. The pump board is logically coupled to a pump controller that authorizes fuel delivery. In at least some embodiments, the pump board is disposed on a pole, and is connected to the pump controller via a hard wired connection. Note that permutations to the above fuel authorization paradigm can be supported by the puck. For example, in some fuel authorization embodiments enabled by the puck no VIN is required to be retrieved from a vehicle memory. The puck can store credentials for the vehicle in a memory component in the puck. In some embodiments, the puck can be connected to an input device, such as a keypad, and a driver can enter in some credentials, such as a PIN. In another fuel authorization program, no IR data link is required, and the IR component can either be omitted or programmed to be inactive if the RF query from the fuel vendor informs the puck that no IR response is required.

Note the puck is intended to be mounted using adhesive tape, industrial quality, on the inside of a windshield of a tractor. The bottom surface is flat to accommodate such a mounting configuration. In an exemplary embodiment, the puck includes three primary interfaces; a 2.4 GHz radio, an RS422 communications port and an interface port used to communicate with a telematics device (such as shown in FIG. 6), and an IR transmitter. The puck includes firmware and processing power sufficient to implement the functions of (1) requesting CAN-bus data from the telematics device (such as VIN), (2) interacting with fuel authorization components at the fuel vendor facility when the truck enters a fuel lane equipped with fuel authorization components. The puck will respond to radio requests that are sent from fuel authorization components at the fuel vendor facility, which can be requests for vehicle data generated by the telematics device or retrieved from the vehicle data bus by the telematics device. The puck will also send the truck or vehicle's Vehicle Identification Number (VIN) to the infrared receiver element in the fuel authorization components at the fuel vendor facility using the puck's IR transmitter. Additional exemplary details regarding the puck are provided in FIGS. 7-11.

FIG. 7 is a front elevation of an exemplary puck 300 implementing the RF and IR components that can be used in a vehicle enrolled in a fuel authorization program generally corresponding to the method of FIG. 1. Note that the alignment lights to be seen disclosed in FIG. 4 can be seen in a window 302. A light 304 has a first color, and a light 306 has a second color. A first light is used to indicate to the driver of the vehicle that an IR data link has been established. The second light is used to indicate to the driver of the vehicle that the IR data transmission is complete, such that if the vehicle needs to be moved relative to the fuel dispenser to enable the fuel dispenser to reach the vehicle's fuel tanks, the movement can be implemented without interrupting the IR data transmission.

FIG. 8 is a rear elevation of puck 300, enabling an IR transmitter 308 to be seen. An opening can be formed in the housing to enable IR radiation to be emitted from the IR transmitter, or a cover substantially transparent to IR radiation can be used. As noted above, the rear face is flat so the rear surface can be attached to a flat windshield using industrial adhesive tape. FIG. 9 is a side elevation of puck 300, enabling a hard wire data link port 310 (such as an RS422 communications port and an interface port) to be seen. Note that the power required by puck 300 can be supplied via port 310, by using a cable that can provide power and data, as is generally known in the art.

FIG. 10 is a functional block diagram showing some of the basic functional components used in puck 300. Such components include lights 304 and 306, IR emitter 308, controller 312, RF component 314, and memory 316. Memory 316 is used to store firmware (i.e., machine instructions) to control the functions implemented by puck 300 (noting that the controller could also be implemented as an ASIC, which may not require memory to control its functionality). In some embodiments memory 316 can also store credentials required in a fuel authorization program, although in at least some embodiments the puck is required by programming to obtain the credentials through a data port 310 (as shown in FIG. 9, but omitted from FIG. 10 for simplicity).

In at least one embodiment, controller 312 implements the function of energizing the IR transmitter upon receiving an RF query from a fuel vendor.

In at least one embodiment, controller 312 implements the function of energizing light 304 when an IR data link is established between the IR emitter in the puck and an IR receiver at the fuel lane.

In at least one embodiment, controller 312 implements the function of energizing light 306 when the transmission of data (such as credentials, which in some embodiments is a VIN from the vehicle) over the IR data link is completed, and the vehicle can be slightly repositioned to accommodate fueling.

In at least one embodiment, controller 312 implements the function of retrieving fuel authorization credentials from memory 316 upon receiving an RF query from a signal from a fuel vendor, and conveying those credentials over the IR data link.

In at least one embodiment, controller 312 implements the function of retrieving fuel authorization credentials from some memory component at the vehicle that is not part of puck 300, via data port 310, upon receiving an RF query from a signal from a fuel vendor, and conveying those credentials over the IR data link.

In at least one embodiment, controller 312 implements the function of using RF component 314 to determine if a reefer tag is present, upon receiving an RF query from a signal from a fuel vendor.

In at least one embodiment, controller 312 implements the function of requesting reefer tag data (discussed in greater detail below) using RF component 314 to determine if a reefer tag is present.

In at least one embodiment, controller 312 implements the function of using RF component 314 to communicate with the fuel vendor that the truck has left the fuel island when the IR data link is terminated (in such a fuel authorization paradigm, fuel delivery is only enabled when the IR data link is active).

In at least one embodiment, controller 312 implements the function of, upon receiving an RF query from a signal from a fuel vendor, using data port 310 to convey instructions to a vehicle controller to activate a vehicle subsystem that can be observed by the camera at the fuel lane, to unambiguously identify which fuel pump to enable if fuel authorization is approved.

In at least one embodiment, controller 312 implements the function of, upon receiving an RF query from a signal from a fuel vendor, using data port 310 to convey instructions to a controller to display or audibly present to a driver some defined action to perform that can be observed by the camera at the fuel lane, to unambiguously identify which fuel pump to enable if fuel authorization is approved.

FIG. 11 includes a plurality of plan views of a commercial implementation of the truck board device of FIG. 7.

It should be understood that the puck discussed above could be modified to function in other fuel authorization paradigms that also include an IR data link. One such variation involves fuel authorization paradigm that relies on a smart phone or tablet computing device (collectively referred to as a mobile computing device) in the enrolled vehicle that includes a fuel authorization application. The mobile computing device will include an RF component, or be logically coupled to an RF component (Wi-Fi being a particularly useful such RF data link). The mobile computing device will be logically coupled to a modified version of puck 300 that need not include an RF component, via data port 310 (i.e., a hard wire data link between the puck and the mobile computing device). The fuel authorization app on the mobile computing device will be launched when the mobile computing device receives an RF query from the fuel vendor. The fuel authorization app on the mobile computing device will instruct the modified puck to establish the IR connection with the fuel vendor. The fuel authorization app on the mobile computing device will provide credentials to the modified puck, which will be sent to the fuel vendor over the IR data link. That enables the fuel vendor to unambiguously determine which fuel lane the vehicle is at (the fuel land receiving the IR transmission). Additional information, if desired, can then be exchanged between the vehicle and fuel vendor over the RF/Wi-Fi network, generally as discussed above. The fuel authorization app on the mobile computing device can obtain the fuel authorization credentials in several ways. In at least one exemplary embodiment, the fuel authorization app on the mobile computing device prompts the driver to enter the credentials into the mobile computing device (such as keying in a PIN or other code). In at least one exemplary embodiment, the fuel authorization app on the mobile computing device can access the credentials from a memory in the mobile computing device. In at least one exemplary embodiment, the fuel authorization app on the mobile computing device acquires the credentials (such as a VIN) from a vehicle data bus (this can be achieved using a hardwire data link between the mobile computing device and the vehicle data bus, or via the smart cable of FIG. 14). In still another embodiment, the credentials are stored in modified puck.

Reefer Fuel

A related fuel authorization system employs additional components that enable fuel to be delivered to fuel tanks for running refrigeration units on trailers of refrigerated cargo boxes (i.e., "reefers"). A modified puck is attached to the reefer trailer. The reefer puck (or reefer tag; see FIGS. 11 and 12) includes a rugged housing enclosing a microcontroller and an RF component. A physical data link couples the Reefer Puck to the reefer trailer, so the Reefer Puck can determine if the trailer is coupled to a tractor, and if the reefer cooler motor is engaged (in at least one embodiment oil pressure is used to determine if the cooler motor is on or off). The microcontroller in Reefer Puck tracks engine hours for the cooler motor, and conveys the engine hours over an RF data link from the Reefer puck to the truck puck (i.e., puck 300) discussed above. In at least one embodiment, the fuel vendor analyzes the cooler motor hours to determine if, or how much, reefer fuel should be dispensed, based on a historical record of past hours and fuel consumed. The fuel vendor can track reefer fuel separately from tractor fuel, as reefer fuel is not subject to the same fuel taxes.

FIG. 12 is a front elevation of an exemplary device 320 (also referred to herein as a reefer tag 320) that can be used in connection with the truck board device of FIG. 7 to either authorize fuel delivery to a refrigerated trailer pulled by a vehicle enrolled in a fuel authorization program generally corresponding to the method of FIG. 1, and/or to facilitate automated collected of fuel use data from a refrigerated trailer.

Reefer tag 320 includes a data cable 322 (which also is used to provide electrical power to reefer tag 320, generally as discussed above) and a data connector 324 enabling reefer tag 320 to be connected with a refrigerated trailer pulled by a vehicle enrolled in a fuel authorization program (for receiving data and power). Reefer tag 320 includes lights 330 and 332 (preferably different colors) that are active during operation. In an exemplary embodiment, the lights are covered by a light pipe, and the lights are LED indicators. A red LED is for power indication and a green LED is for an active radio link (blinking, in at least one embodiment). Note the Reefer Puck or Reefer tag is enclosed in a ruggedized housing for industrial environments.

FIG. 13 is a functional block diagram showing some of the basic functional components used in the reefer tag 320. Such components include lights 330 and 332, data cable 322 controller 324, RF component 328, and memory 326. Memory 326 is used to store firmware (i.e., machine instructions) to control the functions implemented by reefer tag 320 (noting that the controller could also be implemented as an ASIC, which may not require memory to control its functionality). Memory 326 also includes a unique identifier for each reefer tag 320, so that individual refrigerated trailers can be identified during fuel authorization.

In at least one embodiment, controller 324 implements the function of using cable 322 to determine if the trailer that reefer tag 320 is attached to is coupled to a tractor unit upon receiving an RF query from either a puck 300 or a fuel vendor. If the trailer that reefer tag 320 is attached is not coupled to a tractor, it is unlikely the trailer requires fuel. More than likely, the trailer is parked near a fuel vendor, and the RF query can be ignored.

In at least one embodiment, controller 324 implements the function of retrieving a unique ID from memory 326 and conveying that ID over an RF data link in response to receiving an RF query from a fuel vendor or a puck 300.

In at least one embodiment, controller 324 implements the function of using cable 322 to determine if the compressor in the refrigerated unit in the trailer that reefer tag 320 is attached to on, such that cumulative run time can be stored in memory 326.

In at least one embodiment, controller 324 implements the function of using cable 322 to acquire engine hour data from a compressor in the refrigerated unit in the trailer that reefer tag 320 is attached to on, such that cumulative run time can be stored in memory 326.

In at least one embodiment, controller 324 implements the function of conveying cumulative engine hour data (for the compressor in the refrigerated unit in the trailer that reefer tag 320 is attached to) over the RF data link, in response to receiving an RF query from a fuel vendor or a puck 300.

In at least one embodiment, controller 324 implements the function of energizing light 330 when reefer tag 320 has established an RF data link is active.

In at least one embodiment, controller 324 implements the function of energizing light 332 when reefer tag 320 is receiving power from the refrigerated trailer it is installed upon.

In at least one embodiment, controller 324 implements the function of periodically sending cumulative engine hour data (for the compressor in the refrigerated unit in the trailer that reefer tag 320 is attached to) over the RF data link, whenever an RF data link between the reefer tag and a puck is available.

Functional Characteristics for the Reefer Tag:

The refrigerated trailer (RT) system is designed as an extension to the fuel authorization method of FIG. 1 (and related methods) and will allow related fuel authorization systems to 1) identify when a truck with an enrolled vehicle including a puck 300 and reefer tag 320 has pulled into a fuel lane equipped to support the fuel authorization method, 2) provide a unique identifier for a trailer equipped with reefer tag 320, and 3) indicate if the truck is positioned to pump truck fuel or reefer trailer fuel.

Power is provided to reefer tag 320 from the reefer system 12V battery. The reefer tag is designed to draw minimal power from the reefer and will shut itself down when the truck is stopped and the reefer is not running.

In at least one exemplary embodiment, reefer tag 320 and cable 322 employ an RS-232 interface, will be available for future enhancements to integrate with existing reefer telematics systems.

In at least one exemplary embodiment, reefer tag 320 includes engine run detection functionality, so the reefer tag can track engine hours in the reefer chiller unit. Engine hours can then be used to calculate fuel consumed, and fuel required to fill a tank of known size. Note that reefer chiller units generally operate at predictable efficiency levels, making it possible to reasonably accurately determine how empty a fuel tank is, based on starting with a full tank and knowing how many hours the chiller ran.

In exemplary embodiment, reefer tag 320 is waterproof and dustproof, and is IP67 rated. Each reefer tag 320 will have a unique serial number that will be visible when installed. This serial number will be used over the air to identify the device.

When the device is powered up it will automatically query for a truck radio (i.e., a puck 300) to pair with over the radio interface (RF data link). A signal strength protocol can be used to deal with multiple trucks trying to pair with the reefer tag. Once paired the reefer tag will transmit its serial number to the corresponding puck 300. A heartbeat message will be sent between the reefer tag and the truck radio to ensure the two stay paired.

The reefer tag will monitor the engine run detector to determine if the engine is running. While the engine is running it will count the number of minutes the engine runs. That number will be transmitted with the serial number in each heartbeat message. When the reefer tag is powered down the engine run counter will be stored in non-volatile memory and will be read at power-up.

If the reefer tag is configured to utilize the RS-232 interface then the reefer tag will either simply read a string from the serial port using a configured field separator or it will periodically query the serial port and parse the results. The data read from the RS-232 port may include a serial number, engine run hours, or fuel level. This data will be included in the heartbeat message to the truck radio.

Once paired the reefer tag will: Update the engine run time periodically (minimum of 15 minutes) if it is configured to collect engine run time through the sensor. Collect data over the RS-232 interface periodically (minimum of 15 minutes) if configured to do so. Transmit the most current data (engine run hours, serial number, fuel level, etc.) to the truck radio (i.e., puck 300) via the heartbeat message.

In an exemplary embodiment, the combination of reefer tag 320 and puck 300 will be used with the exemplary telematics device of FIG. 6. The telematics device will be programmed to generate a log message every time it pairs with a reefer tag and every time it drops a connection with a reefer tag, except for power off and power on events not associated with the trailer being disconnected from the tractor unit.

Smart Cable

As discussed above FIG. 6 discloses an exemplary telematics box including a GPS component and a cell modem. That unit is relatively expensive, and some fleet operators may not want to purchase such a unit, but still may want to participate in a fuel authorization program. Note that one aspect of some of the fuel authorization methods disclosed above was requiring some component to obtain a vehicle ID (such as a VIN) from a vehicle data base or vehicle controller that could not be readily moved from the vehicle, to reduce the chance that a fuel authorization component would be moved from one vehicle to another to defeat the system. To provide a lower cost option, the ZTOOTH™ smart cable (or smart cable, or J-bus cable) was developed. The smart cable includes a controller configured to enable the smart cable to pull information (such as the VIN or unique vehicle ID) from a vehicle data bus or controller.

FIG. 14 is a rear elevation of an exemplary smart cable 336 that can be used to acquire vehicle data from a vehicle data bus, and convey that data to a mobile computing device, which in at least some embodiments is employed in a fuel authorization program. Smart cable 336 includes a rugged housing 335, mounting lugs 332, a data cable 344a and data plug 334b (to enable the smart cable to be plugged into a vehicle data bus), and one or more of a wireless data link element 334b (such as Wi-Fi, Bluetooth, or RF), and a data port 334a (to enable the smart cable to be plugged into a computing device to receive data from the vehicle data bus, noting that such a computing device can include smart phones, tablets, telematics devices including a processor such as shown in FIG. 6, or the puck of FIG. 7). Some embodiments include both elements 334a and 334b, while other embodiments include only one or the other. It should be noted that some versions of smart cable 336 will have different plugs 344b to enable different versions of the smart cable to plug into different ports in different vehicles (such as a deustch connector or OBD, or OBD-II plug). It should also be noted that some versions of smart cable 336 may not include any plug, as cable 344a will be custom wired into the vehicle data bus where no data port is available.

FIG. 15 is a functional block diagram showing some of the basic functional components used in smart cable 336. Smart cable 336 performs the function of providing a communication link between a vehicle data bus and another computing device, such as a mobile computing device (including tablets and smart phones and the telematics device of FIG. 6), or the Truck Puck (puck 300) used in a fuel authorization program, generally as discussed above. Smart cable 336 includes a data link 334 for talking to a computing device (the device that wants data acquired from a vehicle data bus), a controller 340 that implements the function of acquiring specific data from a vehicle data bus, and a data link 344 to the vehicle data bus. Note that the smart cable, when coupled with an RF component that has established a data link with a fuel vendor, can be used to convey a request from the fuel vendor so that the vehicle display or execute some behavior that can be detected by the camera. In some embodiments the smart cable is able to interact with the vehicle data bus and activate some vehicle subsystem such as a light (see the description of block 13a of FIG. 1B) that can be detected by the camera at the fuel lane. In some embodiments the smart cable is able to interact with a display or a speaker in the vehicle to present graphic or audible instructions to the driver to perform some action (see the description of block 13a of FIG. 1B) that can be detected by the camera at the fuel lane.

It should be understood that the potential uses of smart cable 336 extend well beyond the fuel authorization concepts emphasized herein.

In one related embodiment, smart cable 336 is used to enable smart phone uses to extract vehicle fault code data to their smart phones. In at least one embodiment, a party selling the smart cable charges a fee for each use of the smart cable to access data from the vehicle data bus. Besides fault code data, other data include, but are not limited to, throttle position data, fuel use data, and all other data available via the vehicle data bus/ECU.

In another related embodiment, smart cable 336 is used in connection with a fuel authorization system, such as disclosed in commonly owned patent titled METHOD AND APPARATUS FOR FUEL ISLAND AUTHORIZATION FOR THE TRUCKING INDUSTRY, Ser. No. 12/906,615, the disclosure and drawings of which are hereby specifically incorporated by reference. In such an embodiment, smart cable 336 is used to extract a VIN or ZID that is used in the fuel authorization process, generally as described in the reference patent.

Smart cable 336 can be paired with puck 300 of FIG. 7, to implement all the truck side components required for the fuel authorization method of FIG. 1. Significantly, if the telematics unit of FIG. 6 is used instead of smart cable 336 to implement the fuel authorization method of FIG. 1, then the fleet operator will receive GPS data and fuel authorization functionality from the same hardware. Smart cable 336 when paired with puck 300 will be limited to enable fuel purchase only (and whatever other data can be extracted from the vehicle data bus, such as fault codes), not collection of GPS data.

Each smart cable 336 is serialized (preferably a serial number that is printed on the exterior of the device) and is used to uniquely identify the smart cable. This serial number will be transmitted to the fuel vendor over the RF data link provided by puck 300, when the smart cable is logically coupled to the puck. Each smart cable 336 shall dynamically obtain the VIN from the truck data bus and provide the VIN to the puck, which will convey the VIN to the fuel vendor, generally as described above.

Smart Cable Functionality in Fuel Authorization:

The smart cable will support automated, remote fuel transaction authorization, generally consistent with the fuel authorization concepts disclosed herein. Referring to FIG. 1, the smart cable will be used to obtain a VIN required for the verification data component of block 18. Referring to FIG. 3, the controller portion of both the smart cable and puck of FIG. 7 will implement functions of vehicle controller 42. The smart cable will: (1) Interface with the J1939 interface on a truck and be able to acquire a VIN and other data (fault codes, engine hours, etc. from the vehicle data bus). (2) Interact with the truck board (aka puck) of FIG. 7 (which implements the IR and RF data link elements of the fuel authorization systems disclosed herein). This means that the smart cable will converse with the fuel vendor over the RF data link in the puck so that a truck enrolled in the fuel authorization method of FIG. 1 will be able to identify itself to the fuel vendor, and ultimately authorize a transaction. (3) Support the reefer tag of FIG. 12. (4) Be equipped with a Bluetooth interface (or other wireless data link) so the smart cable can be paired with another device (smart phone, tablet, etc.) over Bluetooth. (5) Should only require a "one-time" configuration that is managed from the paired device. It should be recognized that the smart cable will include some amount of on-board memory. It is possible that some data, such as related to an intermittent fault code, could be stored in the on-board memory to be added to the data offloaded during refueling above. In general, the smart cable is intended to act as a data link between a vehicle data bus and a computing device (such as a smart phone, tablet, or the puck of FIG. 7) rather than device intended to store relatively large amounts of data.

Exemplary Tablet for Presenting Fuel Authorization Instructions to Driver

FIG. 16 is a functional block diagram of an exemplary mobile computing device 100 for fleet telematics including a display 106 and a controller 102 configured to present at least one telematics application to a user, and to present instructions from a fuel vendor during a fuel transactions, where those instructions cause the driver to perform some action that can be observed by the camera at the fuel lane, to enable the fuel authorization system to unambiguously identify which pump should be enabled if the fuel transaction is approved. Note that in some embodiments the tablets may be logically connected to a vehicle data bus, and the tablet can be used to selectively activate some vehicle system to perform some action that can be observed by the camera at the fuel lane, to enable the fuel authorization system to unambiguously identify which pump should be enabled if the fuel transaction is approved. A non-transitory physical memory 104 is included, upon which machine instructions define one or more applications are stored. Note that in embodiments including device 100 the instructions from the fuel vendor can be stored in memory 104 and referred to by an identifier from the fuel vendor, or the instructions from the fuel vendor can be conveyed during each fuel transaction over the RF data link between the fuel vendor and the vehicle. Device 100 includes an optional RFID reader 108 (or other sensor) that enables drivers to log into the tablet, so that authorized fuel transactions are tracked to specific drivers In exemplary but not limiting embodiment, the device includes at least one data input 110 that can be used to logically couple the device to a vehicle data bus or some other device (such as telematics device 160 of FIG. 5).

Device 100 may include additional components, including but not limiting to a GSM component, a Wi-Fi component, a USB component, a rechargeable battery, and in at least one embodiment a GPS component (in which case the GPS/telematics device of FIG. 6 is not required).

Significantly, the display (or speakers) of device 100 can be used to provide the instructions conveyed by the fuel vendor during a fuel authorization request to the driver, in addition to, or instead of the display. Controller 102 can be employed in some embodiments to implement one of more of the vehicle side steps of FIGS. 1A and 1B.

FIG. 17 is a functional block diagram of device 100 implementing a navigation app that is presented to the driver during vehicle operation on display 106. Significantly, an info pane 112 is not consumed by the map portion, and remains visible to the driver. Any instructions conveyed by the fuel vendor during a fuel authorization request to the driver can be visually presented to the driver on info pane 112.

In one preferred embodiment, each driver is provided with an RFID tag, which can be scanned into device 100, or a secret PIN to identify him or herself to the tablet. As compliance with zone based driver behavior rules may be important to a driver's career development, it is important to have a system for unerringly identifying the driver credited with any non-compliant behavior. Other applications, such as the driver log application and inspection application, will similarly employ verifiable credentials. In at least one embodiment, the tablet cannot be used without first logging onto the tablet using verifiable credentials.

Accessory Display for Presenting Fuel Authorization Instructions to Drivers

Another aspect of the concepts disclosed herein is an accessory display that can be used in connection with a telematics device that itself might not include a display, such as the GPS based device of FIG. 6 or the fuel authorization puck of FIG. 7, to provide a display upon which instructions conveyed by the fuel vendor during a fuel authorization request can be presented to the driver, so that the driver performs some action that can be observed by the camera at the fuel lane, to unambiguously identify which fuel pump should be enabled if authorization is approved.

FIG. 18 schematically illustrates an accessory display 115 that can be used along with a processor in the vehicle to visually present some fuel authorization instructions to the driver, so that the driver performs some action that can be observed by the camera at the fuel lane, to unambiguously identify which fuel pump should be enabled if authorization is approved, in accord with the concepts disclosed herein, where the accessory display can also be used to uniquely log in drivers, so any fuel authorizations are tracked to a specific driver. The accessory display does not possess significant processing power, and is used in connection with some other device at the vehicle that provides the required processing in order to what instructions to present to the driver during a fuel authorization request. A data port on the back enables the accessory device to be logically coupled to the device (such as the devices of FIGS. 6 and 7) providing the processing. The accessory device does not need to include a wireless data link when used in connection with other devices having such functionality. The accessory display provides two basic functions (possibly three if equipped with audio). First, the accessory display provides instruction to the driver, so that the driver performs some action that can be observed by the camera at the fuel lane, to unambiguously identify which fuel pump should be enabled if authorization is approved. Second, the accessory display enables drivers to uniquely identify themselves using RFID cards (i.e., the accessory display includes an RFID card reader). If desired, the accessory display can include a speaker to provide audible instructions as well. Also if desired, the RFID component can be eliminated, however, it is desirable to provide some other mechanism to enable drivers to uniquely log into to the fuel authorization system (perhaps using a keyboard, biometric device, or other input device in the vehicle.)

Note than an icon of a hand holding a card is shown on the front of the accessory display. The icon provides the driver a visual reference of where the RFID driver card needs to be relative to the accessory display in order to be read. In some embodiments, the driver's RFID card is required to be scanned as part of each fuel authorization request. In some embodiments, a fuel transaction specific RFID card is required to be scanned as part of each fuel authorization request.

Non-Transitory Memory Medium

Many of the concepts disclosed herein are implemented using a processor that executes a sequence of logical steps using machine instructions stored on a physical or non-transitory memory medium. It should be understood that where the specification and claims of this document refer to a memory medium, that reference is intended to be directed to a non-transitory memory medium. Such sequences can also be implemented by physical logical electrical circuits specifically configured to implement those logical steps (such circuits encompass application specific integrated circuits).

Although the concepts disclosed herein have been described in connection with the preferred form of practicing them and modifications thereto, those of ordinary skill in the art will understand that many other modifications can be made thereto within the scope of the claims that follow. Accordingly, it is not intended that the scope of these concepts in any way be limited by the above description, but instead be determined entirely by reference to the claims that follow.

The invention in which an exclusive right is claimed is defined by the following:

1. A method for administering a fuel authorization program for a fuel vendor operating a plurality of fueling lanes, the method comprising the steps of:
 (a) automatically detecting the presence of a vehicle in a specific fueling lane using a video camera;
 (b) automatically using a radio frequency (RF) component to transmit an RF query from the fuel vendor to the vehicle in response to detecting the presence of the vehicle;
 (c) in response to receiving the RF query at the vehicle, performing some action at the vehicle that can be observed by the video camera, thereby unambiguously identifying the vehicle responding to the RF query;
 (d) automatically analyzing an image from the video camera to detect the action performed at the vehicle and to thereby determine which vehicle in which fuel lane is responding to the RF query, thereby unambiguously identifying which fuel pump is to be enabled if authorization is approved;
 (e) in response to receiving the RF query at the vehicle, automatically conveying fuel authorization credentials from the vehicle to the fuel vendor over an RF data link to verify that the vehicle is enrolled in the fuel authorization program; and
 (f) in response to receiving the fuel authorization credentials from the vehicle at the fuel vendor, automatically determining if the vehicle is authorized to receive fuel, and if so; and
 (g) automatically enabling fuel delivery at the identified fueling lane, so long as the video camera indicates that the vehicle remains in the specific fueling lane;
 wherein the step of automatically using the RF component to transmit the RF query from the fuel vendor to the vehicle in response to detecting the presence of the vehicle comprises the step of automatically including a request defining the action at the vehicle that can be observed by the video camera; and
 wherein the method is performed each time a vehicle enters a fueling lane and wherein the requested action is varied over time to prevent spoofers from learning an action to perform to trick the system into falsely determining that the action is being taken in response to a received request.

2. The method of claim 1, wherein the step of automatically including the request for the defined action comprises the step of defining that the vehicle flash its lights.

3. The method of claim 1, wherein the step of automatically including the request for the defined action comprises the step of defining that the vehicle activate it hazard lights.

4. The method of claim 1, wherein the step of automatically including the request for the defined action comprises the step of defining that the vehicle activate its turn signals.

5. The method of claim 1, wherein the step of automatically including the request for the defined action comprises the step of defining that a driver of the vehicle open and close a driver door a specific number of times.

6. The method of claim 1, wherein the step of automatically including the request for the defined action comprises the step of defining that a driver of the vehicle exit the vehicle and stand in front of the vehicle for a predetermined time.

7. The method of claim 1, wherein the step of automatically including the request for the defined action comprises the step of defining that a driver of the vehicle moves the vehicle backward and forward in a predefined pattern.

8. The method of claim 1, wherein the step of detecting the presence of the vehicle in the specific fueling lane using the video camera comprises the step of using a video camera having an instantaneous field of view that covers more than one specific fuel lane, and automatically analyzing an image provided by the video camera to determine which fuel lane the vehicle is in.

9. A module to be installed at a fuel lane to enable the fuel lane to participate in a fuel authorization program, the module comprising:
(a) a housing;
(b) a video camera to detect a vehicle entering the fuel lane;
(c) a radio frequency (RF) transmitter for establishing an RF data link between the fuel lane and the vehicle disposed in the lane; and
(d) a controller for implementing the following functions:
(i) in response to detecting the vehicle using the video camera, automatically establishing an RF communication link with the vehicle to verify that the vehicle is enrolled in a fuel authorization program, and automatically including a request defining an action at the vehicle that can be observed by the video camera; and
(ii) analyzing images data from the video camera to determine if the defined action has been observed at the vehicle;
(iii) verifying that the vehicle is enrolled in the fuel authorization program, conveying a request to enable fuel delivery at the fuel lane where the defined action was observed;
wherein the controller varies over time the request defining an action to prevent spoofers from learning an action to perform to trick the system into falsely determining that the action is being taken in response to a received request.

10. The module of claim 9, wherein the controller implements the function of automatically defining that the vehicle flash its lights.

11. The module of claim 9, wherein the controller implements the function of automatically defining that the vehicle activate it hazard lights.

12. The module of claim 9, wherein the controller implements the function of automatically defining that the vehicle activate its turn signals.

13. The module of claim 9, wherein the controller implements the function of automatically defining that a driver of the vehicle open and close a driver door a specific number of times.

14. The module of claim 9, wherein the controller implements the function of automatically defining that a driver of the vehicle exit the vehicle and stand in front of the vehicle for a predetermined time.

15. The module of claim 9, wherein the controller implements the function of automatically defining that a driver of the vehicle moves the vehicle backward and forward in a predefined pattern.

16. A method for enabling automated access of a vehicle to a gated facility, the method comprising the steps of:
(a) automatically detecting the presence of a vehicle at a gate using a video camera;
(b) automatically using a radio frequency (RF) component to transmit an RF query from a gate controller to the vehicle in response to detecting the presence of the vehicle;
(c) in response to receiving the RF query at the vehicle, performing some action at the vehicle that can be observed by the video camera, thereby unambiguously identifying the vehicle responding to the RF query;
(d) automatically analyzing an image from the video camera to determine if the action is observed at the gate, thereby unambiguously identifying that the vehicle responding to the RF query is the vehicle at the gate, and not a different vehicle;
(e) in response to receiving the RF query at the vehicle, automatically conveying gate authorization credentials from the vehicle to the gate controller over an RF data link to verify that the vehicle is enrolled in the gate authorization program; and
(f) in response to receiving the gate authorization credentials from the vehicle at the fuel vendor, automatically determining if the vehicle is authorized to enter the gate, and if so; and
(g) automatically opening the gate so the vehicle may pass;
wherein the method is performed each time a vehicle enters a fueling lane and wherein the requested action is varied over time to prevent spoofers from learning an action to perform to trick the system into falsely determining that the action is being taken in response to a received request.

17. The method of claim 16, wherein the step of automatically using the RF component to transmit the RF query from the gate controller to the vehicle in response to detecting the presence of the vehicle comprises the step of automatically including a request defining the action at the vehicle that can be observed by the video camera.

18. The method of claim 17, wherein the step of automatically including the request for the defined action comprises the step of defining at least one of the following:
(a) that the vehicle flash its lights;
(b) that the vehicle activate its hazard lights; and
(c) that the vehicle activate its turn signals.

19. The method of claim 17, wherein the step of automatically including the request for the defined action comprises the step of defining at least one of the following:
(a) that a driver of the vehicle open and close a driver door a specific number of times;

(b) a driver of the vehicle moves the vehicle backward and forward in a predefined pattern; and
(c) a driver of the vehicle exit the vehicle and stand in front of the vehicle for a predetermined time.

\* \* \* \* \*

UNITED STATES PATENT AND TRADEMARK OFFICE
CERTIFICATE OF CORRECTION

| | | |
|---|---|---|
| PATENT NO. | : 9,787,950 B2 | Page 1 of 1 |
| APPLICATION NO. | : 14/217404 | |
| DATED | : October 10, 2017 | |
| INVENTOR(S) | : Michael Charles King, Rick Fadler and Charles Michael McQuade | |

It is certified that error appears in the above-identified patent and that said Letters Patent is hereby corrected as shown below:

In Claim 16(f), Line 40, Column 30, the words "at the fuel vendor" should be deleted.

In Claim 16(g), Line 46, Column 30, the words "enters a fueling lane" should read --approaches the gate--.

Signed and Sealed this
Fourteenth Day of August, 2018

Andrei Iancu
*Director of the United States Patent and Trademark Office*